(12) United States Patent
Oba et al.

(10) Patent No.: US 7,034,858 B2
(45) Date of Patent: Apr. 25, 2006

(54) LED ARRAY EXPOSURE DEVICE, CONTROLLING METHOD THEREOF, AND IMAGE FORMING APPARATUS USING THE SAME

(75) Inventors: Tadashi Oba, Osaka (JP); Jun Nakai, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 18 days.

(21) Appl. No.: 10/691,539

(22) Filed: Oct. 24, 2003

(65) Prior Publication Data

US 2004/0262618 A1 Dec. 30, 2004

(30) Foreign Application Priority Data

| Oct. 30, 2002 | (JP) | ............................ 2002-316101 |
| Oct. 30, 2002 | (JP) | ............................ 2002-316142 |
| Oct. 30, 2002 | (JP) | ............................ 2002-316162 |
| Oct. 30, 2002 | (JP) | ............................ 2002-316351 |
| Oct. 30, 2002 | (JP) | ............................ 2002-316421 |
| Oct. 30, 2002 | (JP) | ............................ 2002-316461 |
| Sep. 19, 2003 | (JP) | ............................ 2003-327770 |
| Sep. 19, 2003 | (JP) | ............................ 2003-327841 |

(51) Int. Cl.
  *B41J 2/435* (2006.01)

(52) U.S. Cl. ...................................... 347/237; 347/247

(58) Field of Classification Search ........ 347/130–133, 347/140, 236–238, 246–247, 135, 143–145; 358/300; 399/51
See application file for complete search history.

(56) References Cited

U.S. PATENT DOCUMENTS 5,124,732 A * 6/1992 Manzer et al. ............... 347/140
5,463,473 A * 10/1995 Yamada et al. ............. 358/300
5,933,682 A * 8/1999 Rushing ....................... 399/51

FOREIGN PATENT DOCUMENTS

| JP | 2002-067372 | | 3/2002 |
| JP | 2002067372 A | * | 3/2002 |
| JP | 2003182152 A | * | 7/2003 |

* cited by examiner

Primary Examiner—Hai Pham
(74) Attorney, Agent, or Firm—Smith, Gambrell, & Russell, LLP

(57) ABSTRACT

Corrected driving currents for a low gray level and a high gray levels are obtained respectively from a standard driving current by incorporating a beam spot area correction coefficient for variations of a beam spot area formed by a light beam emitted from a light-emitting element and transmitted through a lens array; an influence for a low gray level and a high gray level caused by one of a screen angle of pixel, a sensitivity of photoconductor, a surface temperature of photoconductor, and a developing bias voltage; and a light quantity correction coefficient. A driving current for driving the light-emitting element is obtained by using linear interpolation from the two corrected driving currents.

21 Claims, 18 Drawing Sheets

FIG. 10

| | | n | 1 | 2 | 3 | 4 | 5 |
|---|---|---|---|---|---|---|---|
| S1 | PIXEL | | | | | | |
| S2 | GRANULARITY PARAMETER | | | | | | |
| | -SCREEN ANGLE | S | | | 90° | | |
| | -SENSITIVITY OF PHOTOCONDUCTOR | R | | | 4 cm²/μJ | | |
| | -SURFACE TEMPERATURE | T | | | 30°C | | |
| | -DEVELOPING BIAS VOLTAGE | V | | | 320V | | |
| S3 | LIGHT QUANTITY CORRECTION COEFFICIENT | L | 1.1 | 0.8 | 1.5 | 0.9 | 1 |
| S4 | BEAM SPOT AREA | A | 10 | 8 | 15 | 5 | 12 |
| S5 | AVERAGE OF BEAM SPOT AREAS | M | | | 10 | | |
| S6 | DIFFERENCE (M-A) | D | 0 | 2 | -5 | 5 | -2 |
| S7 | RATIO (D/M) | P | 0 | 0.2 | -0.5 | 0.5 | -0.2 |
| S8 | BEAM SPOT AREA CORRECTION COEFFICIENT | B | ASSIGNING WEIGHT TO RATIO (P) FOR EACH PIXEL | | | | |
| S9 | CORRECTION COEFFICIENT | C | BEAM SPOT AREA CORRECTION COEFFICIENT (B) X CORRECTION COEFFICIENT FOR SCREEN ANGLE (S) FOR EACH PIXEL | | | | |
| S10 | DRIVING CURRENT FOR LIGHT-EMITTING ELEMENT | I | STANDARD DRIVING CURRENT X LIGHT QUANTITY CORRECTION COEFFICIENT (L) X CORRECTION COEFFICIENT (C) FOR EACH PIXEL | | | | |

FIG. 11

| | | n | 1 | 2 | 3 | 4 | 5 | 6 | 7 | 8 | 9 | ... N |
|---|---|---|---|---|---|---|---|---|---|---|---|---|
| S21 | PIXEL | | | | | | | | | | | |
| S22 | GRANULARITY PARAMETER | | | | | | | | | | | |
| | -SCREEN ANGLE | S | | | | | 90° | | | | | |
| | -SENSITIVITY OF PHOTOCONDUCTOR | R | | | | | 4 cm²/μJ | | | | | |
| | -SURFACE TEMPERATURE | T | | | | | 30°C | | | | | |
| | -EVELOPING BIAS VOLTAGE | V | | | | | 320V | | | | | |
| S23 | LIGHT QUANTITY CORRECTION COEFFICIENT | L | -1.1 | 0.8 | 1.5 | 0.9 | 1 | 0.5 | 1.2 | 1.3 | 0.5 | ... |
| S24 | BEAM SPOT AREA | A | 10 | 8 | 15 | 5 | 12 | 14 | 6 | 9 | 10 | ... |
| S25-1 | MOVING AVERAGE OF BEAM SPOT AREAS | M1 | | | 10 | | | | | | | |
| S25-2 | | M2 | | | | 10.8 | | | | | | |
| S25-3 | | M3 | | | | | 10.4 | | | | | |
| S25-4 | | M4 | | | | | | 9.2 | | | | |
| S25-5 | | M5 | | | | | | | 10.2 | | | |
| S26 | DIFFERENCE (M-A) | D | 0 | 2.8 | -4.6 | 4.2 | -1.8 | ... | | | | |
| S27 | RATIO (D/M) | P | 0 | 0.26 | -0.44 | 0.46 | -0.18 | ... | | | | |
| S28 | BEAM SPOT AREA CORRECTION COEFFICIENT | B | ASSIGNING WEIGHT TO RATIO (P) FOR EACH PIXEL | | | | | | | | | |
| S29 | CORRECTION COEFFICIENT | C | BEAM SPOT AREA CORRECTION COEFFICIENT (B) × CORRECTION COEFFICIENT FOR SCREEN ANGLE (S) FOR EACH PIXEL | | | | | | | | | |
| S30 | DRIVING CURRENT FOR LIGHT-EMITTING ELEMENT | I | STANDARD DRIVING CURRENT × LIGHT QUANTITY CORRECTION COEFFICIENT (L) × CORRECTION COEFFICIENT (C) FOR EACH PIXEL | | | | | | | | | |

RELATIONSHIP BETWEEN SURFACE TEMPERATURE OF PHOTOCONDUCTOR AND GRANULARITY IN HIGH GRAY LEVEL IN DIFFERENT CORRECTION INTENSITIES

RELATIONSHIP BETWEEN SURFACE TEMPERATURE OF PHOTOCONDUCTOR AND GRANULARITY IN LOW GRAY LEVEL IN DIFFERENT CORRECTION INTENSITIES

FIG. 18

| | | n | 1 | 2 | 3 | 4 | 5 |
|---|---|---|---|---|---|---|---|
| S41 | PIXEL | | | | | | |
| S42 | GRAY LEVEL OF PIXEL | G | 5 | 2 | 7 | 10 | 4 |
| S43 | GRANULARITY PARAMETER | | | | | | |
| | ·SCREEN ANGLE | S | | | 90° | | |
| | ·SENSITIVITY OF PHOTOCONDUCTOR | R | | | 4 cm²/µJ | | |
| | ·SURFACE TEMPERATURE | T | | | 30°C | | |
| | ·DEVELOPING BIAS VOLTAGE | V | | | 320V | | |
| S44 | LIGHT QUANTITY CORRECTION COEFFICIENT | L | 1.1 | 0.8 | 1.5 | 0.9 | 1 |
| S45 | BEAM SPOT AREA | A | 10 | 8 | 15 | 5 | 12 |
| S46 | AVERAGE OF BEAM SPOT AREAS | M | | | 10 | | |
| S47 | DIFFERENCE (M−A) | D | 0 | 2 | −5 | 5 | −2 |
| S48 | RATIO (D/M) | P | 0 | 0.2 | −0.5 | 0.5 | −0.2 |
| S49 | BEAM SPOT AREA CORRECTION COEFFICIENT | B | ASSIGNING WEIGHT TO RATIO (P) | | | | |
| S50-1 | CORRECTION COEFFICIENT AT POINT *a* | Ca | BEAM SPOT AREA CORRECTION COEFFICIENT (B) × CORRECTION COEFFICIENT FOR SCREEN ANGLE (S) IN LOW GRAY LEVEL | | | | |
| S50-2 | CORRECTION COEFFICIENT AT POINT *b* | Cb | BEAM SPOT AREA CORRECTION COEFFICIENT (B) × CORRECTION COEFFICIENT FOR SCREEN ANGLE (S) IN HIGH GRAY LEVEL | | | | |
| S51-1 | DRIVING CURRENT AT POINT *a* | Ia | STANDARD DRIVING CURRENT × LIGHT QUANTITY CORRECTION COEFFICIENT (L) × CORRECTION COEFFICIENT (Ca) AT POINT *a* | | | | |
| S51-2 | DRIVING CURRENT AT POINT *b* | Ib | STANDARD DRIVING CURRENT × LIGHT QUANTITY CORRECTION COEFFICIENT (L) × CORRECTION COEFFICIENT (Cb) AT POINT *b* | | | | |
| S51-3 | CORRECTED DRIVING CURRENT | Ig | LIEAR INTERPOLATION FROM Ia TO Ib ACCORDING TO GRAY LEVEL G OF PIXEL | | | | |

FIG. 19

| | | 1 | 2 | 3 | 4 | 5 | 6 | 7 | 8 | 9 | ... N |
|---|---|---|---|---|---|---|---|---|---|---|---|
| S61 | PIXEL | n | | | | | | | | | |
| S62 | GRAY LEVEL OF PIXEL | G | 5 | 2 | 7 | 10 | 4 | 1 | 14 | 3 | 9 | ... |
| S63 | GRANULARITY PARAMETER<br>-SCREEN ANGLE<br>-SENSITIVITY OF PHOTOCONDUCTOR<br>-SURFACE TEMPERATURE<br>-DEVELOPING BIAS VOLTAGE | S<br>R<br>T<br>V | | | | | 90°<br>4 cm²/µJ<br>30°C<br>320V | | | | | |
| S64 | LIGHT QUANTITY CORRECTION COEFFICIENT | L | 1.1 | 0.8 | 1.5 | 0.9 | 1 | 0.5 | 1.2 | 1.3 | 0.5 | ... |
| S65 | BEAM SPOT AREA | A | 10 | 8 | 15 | 5 | 12 | 14 | 6 | 9 | 10 | ... |
| S66-1 | MOVING AVERAGE OF BEAM SPOT AREAS | M1 | | | 10 | | | | | | | |
| S66-2 | | M2 | | | | 10.8 | | | | | | |
| S66-3 | | M3 | | | | | 10.4 | | | | | |
| S66-4 | | M4 | | | | | | 9.2 | | | | |
| S66-5 | | M5 | | | | | | | 10.2 | | | |
| S67 | DIFFERENCE (M-A) | D | 0 | 2.8 | -4.6 | 4.2 | -1.8 | | | | | |
| S68 | RATIO (D/M) | P | 0 | 0.26 | -0.44 | 0.46 | -0.18 | ... | ... | | | |
| S69 | BEAM SPOT AREA CORRECTION COEFFICIENT | B | ASSIGNING WEIGHT TO RATIO (P) | | | | | | | | | |
| S70-1 | CORRECTION COEFFICIENT AT POINT a | Ca | BEAM SPOT AREA CORRECTION COEFFICIENT (B) X CORRECTION COEFFICIENT FOR SCREEN ANGLE (S) IN LOW GRAY LEVEL | | | | | | | | | |
| S70-2 | CORRECTION COEFFICIENT AT POINT b | Cb | BEAM SPOT AREA CORRECTION COEFFICIENT (B) X CORRECTION COEFFICIENT FOR SCREEN ANGLE (S) IN HIGH GRAY LEVEL | | | | | | | | | |
| S71-1 | DRIVING CURRENT AT POINT a | Ia | STANDARD DRIVING CURRENT X LIGHT QUANTITY CORRECTION COEFFICIENT (L) X CORRECTION COEFFICIENT (Ca) AT POINT a | | | | | | | | | |
| S71-2 | DRIVING CURRENT AT POINT b | Ib | STANDARD DRIVING CURRENT X LIGHT QUANTITY CORRECTION COEFFICIENT (L) X CORRECTION COEFFICIENT (Cb) AT POINT b | | | | | | | | | |
| S71-3 | CORRECTED DRIVING CURRENT | Ig | LINEAR INTERPOLATION FROM Ia TO Ib ACCORDING TO GRAY LEVEL G OF PIXEL | | | | | | | | | |

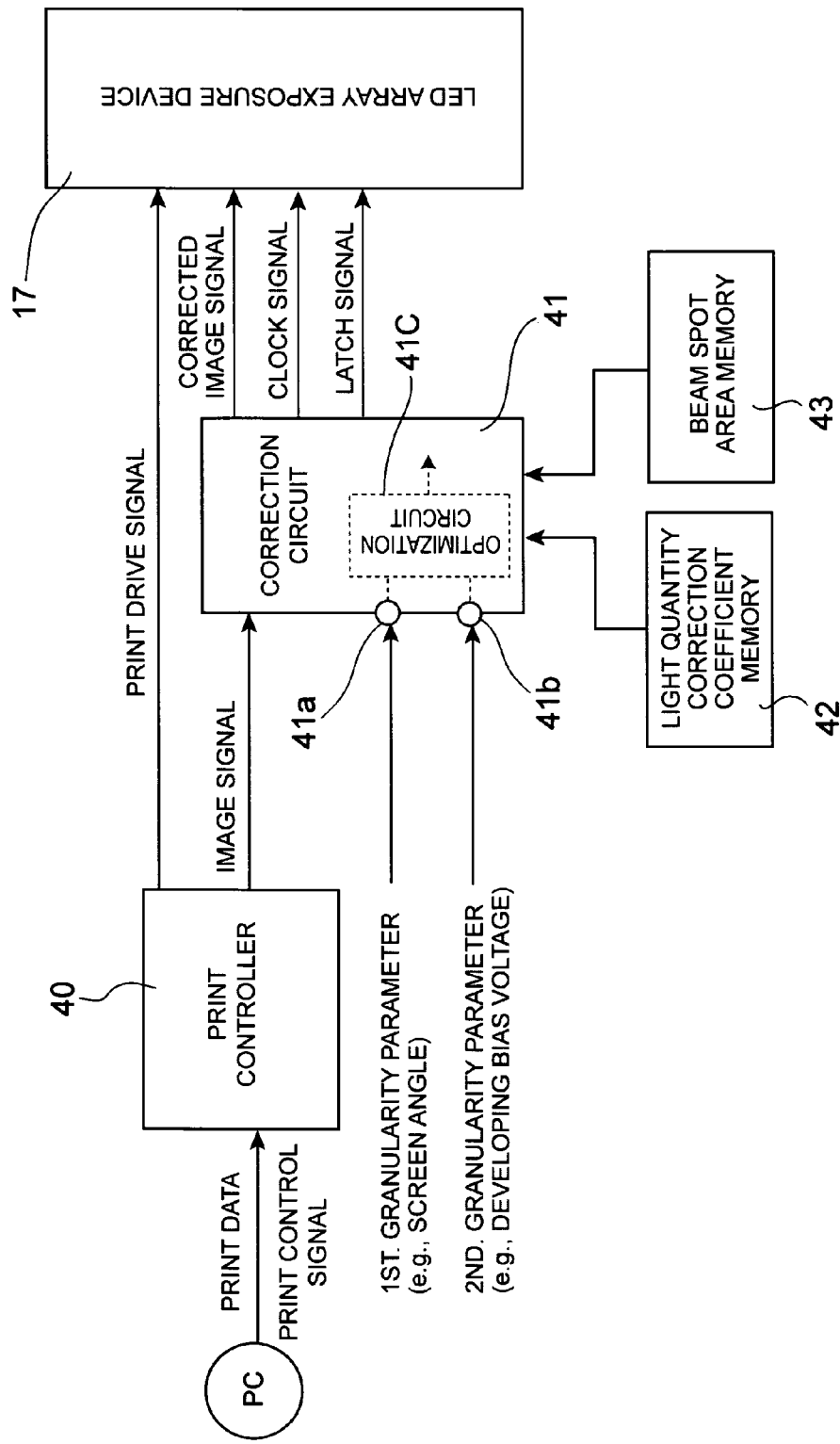

LED ARRAY EXPOSURE DEVICE, CONTROLLING METHOD THEREOF, AND IMAGE FORMING APPARATUS USING THE SAME

BACKGROUND OF THE INVENTION

1. Field of the Invention

The present invention relates to an LED array exposure device for use in recording an image, a controlling method thereof, and an image forming apparatus using the LED array exposure device.

2. Description of the Prior Art

As a device for exposing a photoconductor with digital image information, there is a laser exposure device using laser beams for exposing or an LED array exposure device using a plurality of extremely small LEDs (light-emitting diodes), each of which corresponds to one dot of the digital image, is laid linearly in an array shape, and is arranged along an axis of the photoconductor (a direction of main scanning) for exposing the photoconductor. Particularly in recent years, the LED array exposure device has been extensively used for printers and other image forming apparatuses on the grounds that the LED array exposure device is smaller in size, lower in cost, easier to control, higher in reliability because no mechanical moving parts and the like are used.

The LED array exposure device as mentioned above comprises a printed circuit board, an LED array chip mounted thereon, a driver IC for delivering current and driving the LED array chip, a lens array formed as a cluster by a plurality of lenses and arranged between a light-emitting plane of the LED array chip and the photoconductor so that light beams emitted from light-emitting elements (light-emitting diodes) are converged on the photoconductor to form an image thereon, supporting members for supporting these components, and the like.

One or a plurality of LED array chips are laid on the printed circuit board for exposing an entire effective scanning width, at least a width of a paper or wider, and constitute an exposing light source for forming an electrostatic latent image on the electrostatically charged photoconductor. Extremely small light-emitting elements, each of which corresponding to each of pixels of video data (image data) in a direction of main scanning, are aligned in a raw on the LED array chip. At least a total number of 5120 light-emitting elements are required for one or a plurality of LED array chips, when, for example, an A4 size recording width is to be exposed in a resolution of 600 dpi.

The driver IC has a circuit for driving each light-emitting element so that the light-emitting element emits light, and one or a plurality driver ICs are mounted on the printed circuit board (or provided externally). The lens array is made by arranging a plurality of cylindrically shaped lenses in a cluster form so as to converge light beams emitted from the light-emitting elements on the photoconductor so that the photoconductor is exposed by a dot.

However, the light intensity varies among the light-emitting elements. As a result, these variations show up as uneven densities or streaks in a visible image formed on a paper and cause a quality deterioration in a recorded image. To cope with this problem, a conventional LED array exposure device is provided with prearranged light intensity correction data for each light-emitting element for compensating for the intensity of light to be emitted therefrom so that exposure energy emitted from each light-emitting element is corrected in accordance with the light intensity correction data so that the exposing energy becomes equal to each other Furthermore, when there are variations in resolving power due to an uneven layout of the lens array or when the light-emitting element is out of place and defocused due to an error in mounting the lens array, a dot shape formed on the photoconductor is deformed or the resolving power of each light-emitting element becomes uneven. Even if variations in light intensity among the light-emitting elements are corrected within ±2%, if there are variations in resolving power because of the lens array, the uneven densities will appear conspicuously in a visible image.

To overcome the above-mentioned problem, Japanese Patent Application Laid-Open No. 2002-67372 discloses an LED print head. In this LED print head, light from each light-emitting element is received and measured by a sensor portion, a relationship between the light and a scanning distance of the sensor portion is obtained, and light output of the light-emitting element is adjusted so that the intensity of the received light when sensitivity of a photoconductor is made to be threshold becomes a desired value. When a method in which the light output as measured above is converted into a theoretical beam diameter based on the threshold which is converted from the sensitivity of the photoconductor and the light output is adjusted accordingly so as to make the beam diameters uniform is employed, each beam diameter becomes equal to each other theoretically.

However, if a granularity of the visible image is large, then uneven densities or streaks become conspicuous in the image. It has been shown that the magnitude of the granularity of image varies depending on such factors as a screen angle of pixel, a sensitivity of photoconductor, a surface temperature of photoconductor (the temperature that affects the sensitivity of photoconductor), a developing bias voltage, or the like, which will be discussed later.

In a color image forming apparatus that forms a full-color image by using three or four colors, the screen angle of the image for each color is different from each other. When a LED array exposure device is used in this type of image forming apparatus, the uneven densities or streaks become conspicuous due to the screen angles that are different from color to color. As a result, not only do uneven densities or streaks occur, but also color reproducibility is adversely affected and recording quality is significantly degraded. A black and white image forming apparatus that usually uses a screen angle of 45 degrees also suffers a similar degradation in recording quality.

Furthermore, when the sensitivity of photoconductor is high, the photoconductor responds more sensitively to variations in light quantity and in beam spot area of the light-emitting element. This makes the uneven densities or streaks to be easily recognizable as if the variations were amplified. Particularly, in a tandem-type color image forming apparatus that uses a plurality of image forming sections for forming an image in different colors simultaneously, the photoconductors on which the image is formed are different. Because of this reason, unless variations in sensitivity are compensated, the magnitude of the uneven densities becomes different from color to color, thereby causing an adverse effect in reproducibility of colors. Moreover, depending on types, there are such photoconductors of which the sensitivity is largely influenced by the surface temperature thereof. This means that, if the photoconductor is highly temperature dependant, the same problem is caused by fluctuations of the surface temperature of the photoconductor.

It has also been shown that the uneven densities tend to become conspicuous depending on the developing bias voltage to be applied to a developing roller during developing process in which a latent image is developed and made visible. Because the developing bias voltage acts as a so-called threshold value when the electrostatically charged latent image attracts toners, a higher bias voltage raises the threshold value for a high-density pixel and a lower bias voltage lowers the threshold value for a low-density pixel respectively. As a result of this, in either case, the variations in light quantity and in beam spot area among the light-emitting elements are reflected conspicuously so as to be easily recognized as uneven densities or streaks. Particularly, because properties of toners or developing units are different from color to color in the tandem-type color image forming apparatus, the bias voltage to be applied to each of the developing units may be set differently from each other. Moreover, even in a black and white image forming apparatus having a single developing unit, it is sometimes necessary to adjust and set a different bias voltage from apparatus to apparatus due to variations among components and apparatuses. In this case, the influence of different bias voltages exerted upon the occurrence of uneven densities and streaks cannot be ignored.

However, the aforementioned conventional technology does not suggest performing a control for correcting for factors that aggravate the above-mentioned granularity of image.

SUMMARY OF THE INVENTION

An object of the present invention is, in light of the above-mentioned problems, to provide an LED array exposure device, a control method thereof, and an image forming apparatus using the LED array exposure device capable of forming an image whose density changes linearly with significantly reduced uneven densities or streaks appearing in the image by way of applying corrections for variations in light quantity and beam spot area of each light-emitting element, and also by way of applying corrections for such a factor affecting a granularity of the image that is formed by the LED exposure device in accordance with pixel data having the gradation.

To achieve the above object, according to the present invention, an LED array exposure device comprising a plurality of light-emitting elements for exposing a photoconductor so as to form an image, the light-emitting element, so as to be compensated for variations, driven by a driving current obtained from a standard driving current common to the light-emitting elements through a process of incorporating a light quantity correction coefficient for compensating for variations of a light quantity emitted from the light-emitting element and a beam spot area correction coefficient for compensating for variations of a beam spot area formed on the photoconductor, the light-emitting element being so controlled as to be driven by the driving current for a length of time in accordance with a gray level of an image pixel to which the light-emitting element corresponds, wherein the driving current for the light-emitting element is obtained from the standard driving current common to the light-emitting elements by incorporating the light quantity correction coefficient, the beam spot area correction coefficient, and further, a correction coefficient in accordance with a magnitude of a parameter that affects a granularity of the image. As a result of this configuration, the LED array exposure device relating to the present invention is capable of reducing significantly, particularly, uneven densities or streaks which appear in the image and which have not been effectively prevented by performing a conventional way of corrections only for variations in light quantity and in beam spot area.

The beam spot area correction coefficient is a value that corresponds to a magnitude of a difference between an average value obtained by averaging out beam spot areas of a plurality of light-emitting elements including the light-emitting element for which a correction is performed and the beam spot area of the light-emitting element for which a correction is performed. According to this configuration, an adverse effect caused by a sharp step-by-step correction and sudden changes in image density are hard to occur.

Furthermore, the plurality of light-emitting elements are shifted along with the light-emitting element for which a correction is performed so that a moving average is obtained as the average value of beam spot areas. In this configuration, the correction is performed gradually, thereby causing borders of corrections hard to be recognized and further suppressing the occurrence of uneven densities or streaks.

The plurality of light-emitting elements comprise the light-emitting element for which a correction is performed and light-emitting elements immediately following thereto. This configuration provides an advantage in which calculations or a circuit configuration for performing corrections is made simpler.

The LED array exposure device comprises a plurality of LED array chips and the plurality of light-emitting elements comprise light-emitting elements within an identical LED array chip which includes the light-emitting element for which a correction is performed. Consequently, the correction control can be performed for each chip and its process either by software or circuitry is made easier.

The parameter affecting the granularity of the image is a screen angle peculiar to an image pixel corresponding to the light-emitting element. Therefore, when the LED array exposure device is used in a full color image forming apparatus that produces from image data that includes a different screen angle for cyan, magenta, yellow, and black, a full color image by superimposing these colors, it is possible to prevent the granularity of image among these colors or photoconductors from changing greatly and suppress the occurrence of uneven densities or streaks in the image significantly.

The parameter affecting the granularity of the image is a sensitivity of the photoconductor. Therefore, when the LED array exposure device is used in a tandem-type full color image forming apparatus in which different photoconductors are used for each color of cyan, magenta, yellow, and black to form a full color image by superimposing these colors, it is possible to prevent the granularity of image among these colors or photoconductors from changing greatly and suppress the occurrence of uneven densities or streaks in the image significantly.

The parameter affecting the granularity of the image is a surface temperature of the photoconductor. Therefore, not only when the LED array exposure device is used in a tandem-type full color image forming apparatus that uses different photoconductors, but also when it is used in a black and white or a full color image forming apparatus that uses a single photoconductor, it is possible to prevent the granularity of image from changing greatly by fluctuating surface temperature of the photoconductor and suppress the occurrence of uneven densities or streaks in the image significantly.

The parameter affecting the granularity of the image is a developing bias voltage applied to a developing apparatus.

Therefore, when the LED array exposure device is used in a tandem-type full color image forming apparatus in which different developing units are used for each color of cyan, magenta, yellow, and black to form a full color image by superimposing these colors, it is possible to prevent the granularity of image among these colors or developing units from changing greatly and suppress the occurrence of uneven densities or streaks in the image significantly.

Furthermore, according to another aspect of the present invention, an LED array exposure device comprising: a plurality of light-emitting elements for exposing a photoconductor so as to form an image, the light-emitting element, so as to be compensated for variations, driven by a driving current obtained from a standard driving current common to the plurality of light-emitting elements through a process of incorporating a light quantity correction coefficient for compensating for variations of a light quantity emitted from the light-emitting element and a beam spot area correction coefficient for compensating for variations of an area of a beam spot formed on the photoconductor, the light-emitting element being so controlled as to be driven by the driving current for a length of time in accordance with a gray level of an image pixel to which the light-emitting element corresponds, wherein, first, a driving current in a low gray level is obtained through a process of multiplying the standard driving current by a correction coefficient corresponding to a magnitude of a parameter affecting a granularity of the image when the image pixel has a low gray level, the beam spot area correction coefficient for the light-emitting element, and the light quantity correction coefficient for the light-emitting element; second, a driving current in a high gray level is obtained through a process of multiplying the standard driving current by a correction coefficient corresponding to a magnitude of a parameter affecting an granularity of the image when the image pixel has a high gray level, the beam spot area correction coefficient for the light-emitting element, and the light quantity correction coefficient for the light-emitting element; and finally, the driving current for driving the light-emitting element is obtained by using linear interpolation from the driving current in the low gray level to the driving current in the high gray level in accordance with the gray level of the image pixel to which the light-emitting element corresponds. As a result of this configuration, the LED array exposure device relating to the present invention is capable of reducing significantly uneven densities or streaks which appear conspicuously in the image due to differences of the image granularities in a low and a high gray levels and which have not been effectively prevented by performing a conventional way of corrections only for variations in light quantity and in beam spot area.

Furthermore, according to another aspect of the present invention, a controlling method of an LED array exposure device comprising a plurality of light-emitting elements for exposing a photoconductor, including: a first step of factoring a light quantity correction coefficient for correcting for a variation of a light quantity of a light-emitting element into a standard driving current common to the plurality of light-emitting elements; a second step of factoring a beam spot area correction coefficient for correcting for a variation of an area of a beam spot formed on the photoconductor by the light-emitting element into a value obtained in the first step; a third step of factoring a correction coefficient in accordance with a magnitude of a parameter that affects a granularity of the image formed on the photoconductor into a resultant value obtained in the second step; and a fourth step of driving the light-emitting element by feeding an amount of current equivalent to the value obtained in the third step. As a result of this configuration, the LED array exposure device relating to the present invention is capable of reducing significantly, particularly, uneven densities or streaks which appear in the image and which have not been effectively prevented by performing a conventional way of corrections only for variations in light quantity and in beam spot area.

Furthermore, according to another aspect of the present invention, a controlling method of an LED array exposure device comprising a plurality of light-emitting elements for exposing a photoconductor, including: a first step of obtaining a driving current in a low gray level through a process of multiplying a standard driving current common to the plurality of light-emitting elements by a) a light quantity correction coefficient for correcting for a variation of a light quantity of a light-emitting element, b) a beam spot area correction coefficient for correcting for a variation of an area of a beam spot formed on the photoconductor by the light-emitting element, and c) a correction coefficient corresponding to a magnitude of a parameter affecting a granularity of an image when a image pixel corresponding to the light-emitting element has a low gray level; a second step of obtaining a driving current in a high gray level through a process of multiplying the standard driving current common to the plurality of light-emitting elements by a) the light quantity correction coefficient for correcting for a variation of a light quantity of the light-emitting element, b) the beam spot area correction coefficient for correcting for a variation of an area of a beam spot formed on the photoconductor by the light-emitting element, and c) a correction coefficient corresponding to a magnitude of a parameter affecting a granularity of an image when the image pixel corresponding to the light-emitting element has a high gray level; and a third step of obtaining a driving current by which the light-emitting element is driven by using linear interpolation from the driving current in the low gray level to the driving current in the high gray level in accordance with a gray level of the image pixel to which the light-emitting element corresponds. As a result of this configuration, the LED array exposure device relating to the present invention is capable of reducing significantly, particularly, uneven densities or streaks which appear in the image and which have not been effectively prevented by performing a conventional way of corrections only for variations in light quantity and in beam spot area.

BRIEF DESCRIPTION OF THE DRAWINGS

This and other objects and features of the present invention will become clear from the following description, taken in conjunction with the preferred embodiments with reference to the accompanying drawings in which:

FIG. 10 is a flowchart-type schematic diagram showing the first correction method relating to the present invention to be performed in driving each light-emitting element;

FIG. 11 is a flowchart-type schematic diagram showing the second correction method relating to the present invention to be performed in driving each light-emitting element;

FIG. 18 is a flowchart-type schematic diagram showing the third correction method relating to the present invention to be performed in driving each light-emitting element;

FIG. 19 is a flowchart-type schematic diagram showing the fourth correction method relating to the present invention to be performed in driving each light-emitting element;

FIG. 20, based on FIG. 9 relating to the first and second correction methods, is a diagram showing a method in which two types of granularity parameters are fed in; a granularity correction coefficient by which the granularity is minimized is obtained through the optimization circuit; and thus obtained granularity correction coefficient is used in a correction circuit.

DESCRIPTION OF THE PREFERRED EMBODIMENTS

Figure 1:
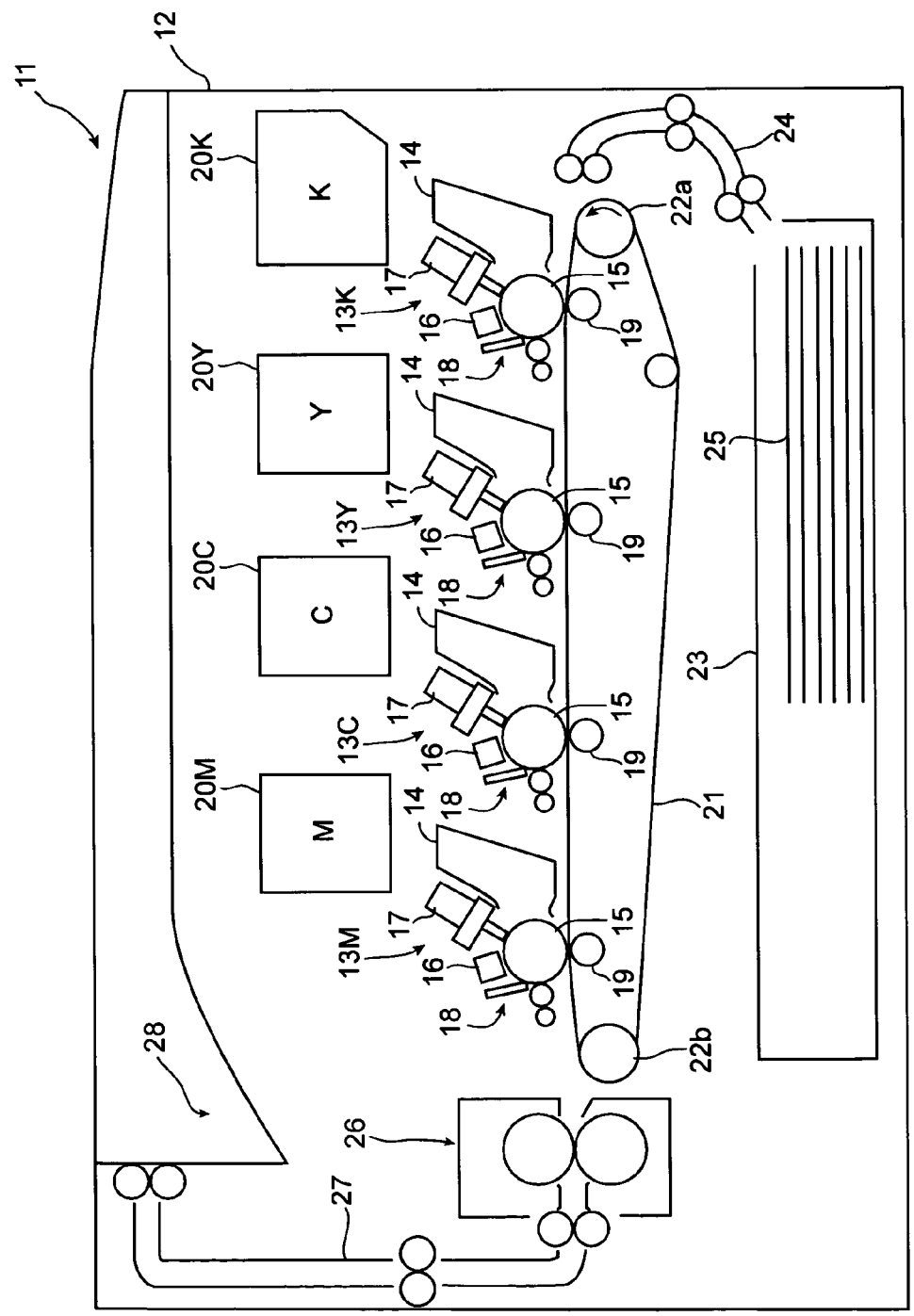
FIG. 1 is a simplified schematic diagram showing a front view of the LED array exposure device relating to the present invention.

Hereinafter, embodiments of the present invention will be described with reference to the accompanying drawings. First, a color printer is taken as an example of an image forming apparatus using an LED array exposure device relating to the present invention, and structure thereof is briefly described. FIG. 1 is a simplified schematic diagram showing a front view of the LED array exposure device relating to the present invention.

In FIG. 1, reference numeral 11 represents a color printer as an example of an image forming apparatus. The color printer 11 comprises a housing 12, an image forming section for black 13K, an image forming section for yellow 13Y, an image forming section for cyan 13C, an image forming section for magenta 13M, toner hoppers 20K, 20Y, 20C, and 20M respectively for each color, a paper feed cassette 23 for storing a plurality of papers 25, a paper feed guide 24, transport belt driving rollers 22a and 22b, a transport belt 21, an image transfer roller 19, a fuser section 26, a paper feed-out guide 27, and a paper feed-out section 28. In addition, each of the image forming sections 13K, 13Y, 13M, and 13M for each color comprises a developing unit 14, a photoconductor 15, a main charging unit 16, an LED array exposure device 17, and a cleaning section 18.

In the color printer 11, an electrostatic latent image is formed by the LED array exposure device 17 on the photoconductor 15 that has been charged by the main charging unit 16. Then, the latent image is developed by the developing unit 14 so that a visible image is formed. This process is performed for each color. The paper 25 fed from the paper feed cassette 23 is guided through the paper feed guide 25, sucked onto an upper face of the transport belt 21 which is rotating in counterclockwise direction as shown in the drawing, and transported further. Thereafter, when the paper 25 passes right under each of the image forming sections 13K, 13Y, 13M, and 13M for each color, the image in each color is transferred onto the paper one after another by the transfer roller 19. A full-color image formed on the paper in this way is fixed when the paper 25 passes through the fusing section 26. After that, the paper 25 is fed out in the paper feed-out section 28 guided by the paper feed-out guide 27.

Figure 2:
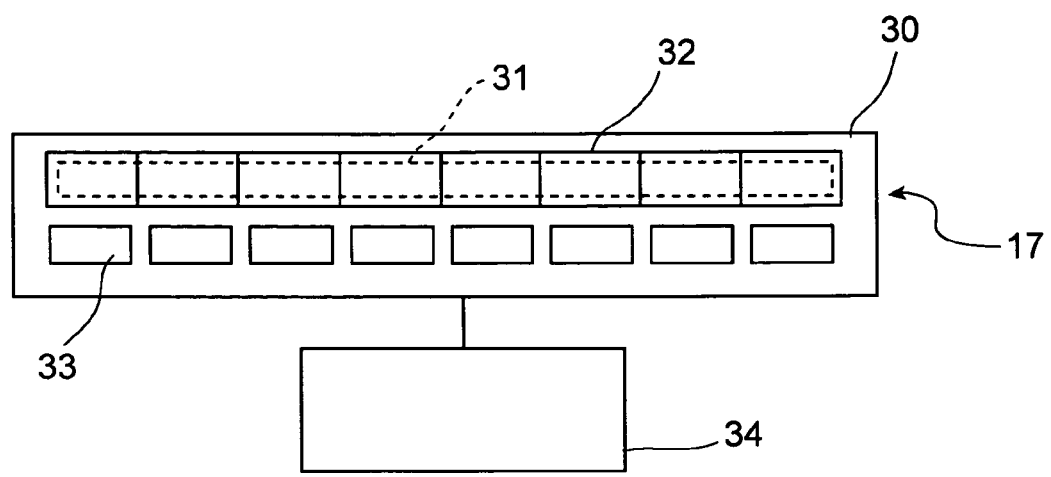
FIG. 2 is a simplified schematic diagram showing a top view of the LED array exposure device 17 relating to the present invention.

Next, the LED array exposure device 17 installed in the color printer 11 is described in details with reference to FIG. 2. FIG. 2 is a simplified schematic diagram showing a top view of the LED array exposure device 17 relating to the present invention. The LED array exposure device 17 comprises one or a plurality of LED array chips 31 laid in line on a substrate 30 having unillustrated wiring, a lens array 32 arranged over the LED array chips 31 so as to form a full-size erect image, and one or a plurality of driver ICs 33 each including circuitry for driving unillustrated individual light-emitting elements that form the LED array chip 31. In actual cases, the substrate 30 and the lens array 32 are supported by unillustrated structural members. In some cases, a controller section 34 for performing a process of correction for lighting of each light-emitting element may be provided externally.

Figure 3:
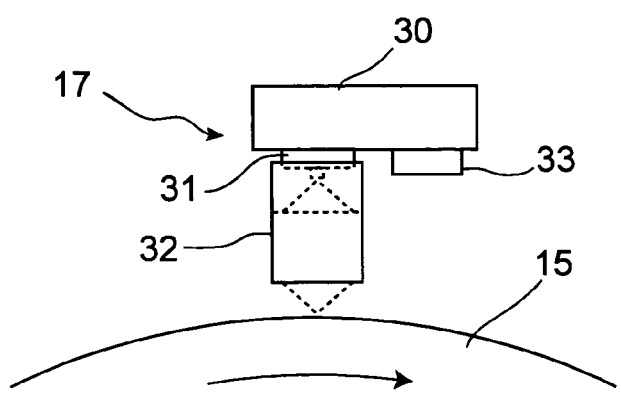
FIG. 3 is a schematic diagram showing a partial front view when the LED array exposure device 17 is mounted in the color printer 11.

FIG. 3 is a schematic diagram showing a partial front view when the LED array exposure device 17 is mounted in the color printer 11. Here, such components as are found also in FIG. 2 are identified with the same reference numerals and descriptions thereof are not repeated. In the drawing, reference numeral 18 is the drum-shaped photoconductor 15 rotating in a direction shown by an arrow. Shown also in the drawing in broken line is how the light emitted from the light-emitting element is received and refracted by the lens array 32 so as to form an image on the surface of the photoconductor 15.

As shown above, each light-emitting element is driven in accordance with pixel data included in print data that are transmitted to the color printer 11 shown in FIG. 1 from an unillustrated external PC, and emits light. The light forms an image as a dot on the photoconductor 15 through the lens array 32 (see FIGS. 2 and 3). As explained about the conventional technology, in order to compensate for the variations in exposure energy of each light-emitting element, correction data are calculated based on a known method for correcting for a driving current and/or a lighting time of each light-emitting element according to the exposure energy, measured in advance, of each light-emitting element. Then, thus obtained correction data is memorized as a light quantity correction coefficient in a memory provided in the controller section 34 shown in FIG. 2, in an unillustrated controller section of the color printer 11 shown in FIG. 1, or in the LED array exposure device 17.

Next, each beam spot area formed through the lens array 32 for all light-emitting elements included in an entire effective scanning width of the LED array exposure device 17 is measured in advance. Each beam spot area, thus obtained, is memorized in the memory provided in the controller section 34 shown in FIG. 2, in an unillustrated controller section of the color printer 11 shown in FIG. 1, or in the LED array exposure device 17. Described hereunder are correction methods based on the light quantity correction coefficient and the beam spot area memorized in the above-mentioned memory for further reducing the uneven densities or streaks and for making it possible to form an image having a linearly changing halftones.

As mentioned before, the factors that affect the granularity of image include the screen angle of pixel, the sensitivity of photoconductor, the surface temperature of photoconductor, and the developing bias voltage. Hereinafter, these factors that influence the granularity of image are called granularity parameters of which details will be described below.

Figure 4:
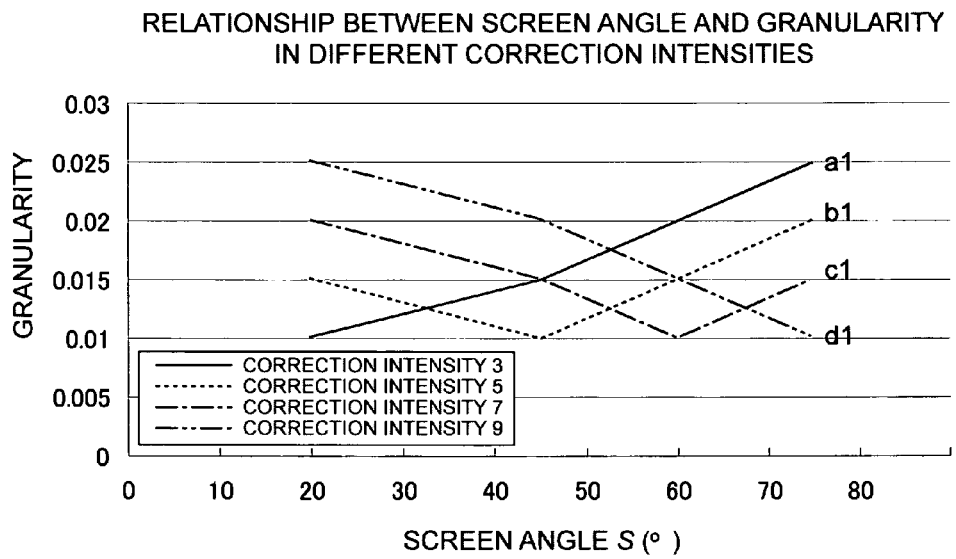
FIG. 4 is a diagram showing how a correction for the screen angle affects the granularity of image.

1) The screen angle of pixel. FIG. 4 is a diagram showing how a correction for the screen angle affects the granularity of image. The vertical axis shows the granularity and the horizontal axis shows the screen angle. A line with reference numeral a1, b1, c1, or d1 shows each relationship between the granularity with a correction intensity of 3, 5, 7, or 9 and the screen angle. The larger the correction intensity value is, the more intensively the correction is applied.

The printed image becomes coarser when the granularity value becomes larger, and the printed image becomes finer when the granularity value becomes smaller. For this reason, the uneven densities or streaks appearing in the printed image tend to become conspicuous and easily recognizable by human eyes when the granularity value is larger. According to FIG. 4, it is understood that an image having a larger screen angle is prone to have a higher granularity and develop uneven densities or streaks unless the correction intensity is increased. By contrast, an image having a smaller screen angle will have a higher granularity and develop an identical problem if the correction intensity is increased. In other words, pixels printed at a larger screen angle tend to develop the uneven densities or streaks easily.

Figure 5:
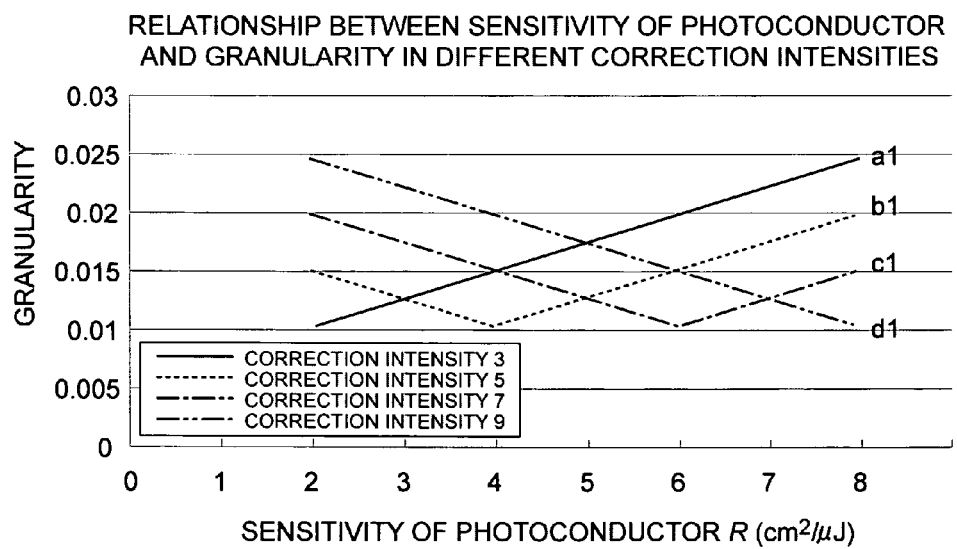
FIG. 5 is a diagram showing how a correction for the sensitivity of photoconductor affects the granularity of image.

The sensitivity of photoconductor. FIG. 5 is a diagram showing how a correction for the sensitivity of photoconductor affects the granularity of image. The vertical axis shows the granularity and the horizontal axis shows the sensitivity of photoconductor. A line with reference numeral a1, b1, c1, or d1 shows each relationship between the sensitivity of photoconductor with a correction intensity of 3, 5, 7, or 9 and the screen angle. The larger the correction intensity value is, the more intensively the correction is applied.

The printed image becomes coarser when the granularity value becomes larger, and the printed image becomes finer when the granularity value becomes smaller. For this reason, the uneven densities or streaks appearing in the printed image tend to become conspicuous and easily recognizable by human eyes when the granularity value is larger. According to FIG. 5, it is understood that an image formed by a photoconductor having a higher sensitivity is prone to have a higher granularity and develop uneven densities or streaks unless the correction intensity is increased. By contrast, an image formed by a photoconductor having a lower sensitivity will have a higher granularity and develop an identical problem if the correction intensity is increased. In other words, pixels printed by using a photoconductor having a higher sensitivity tend to develop the uneven densities or streaks easily.

Figure 6:
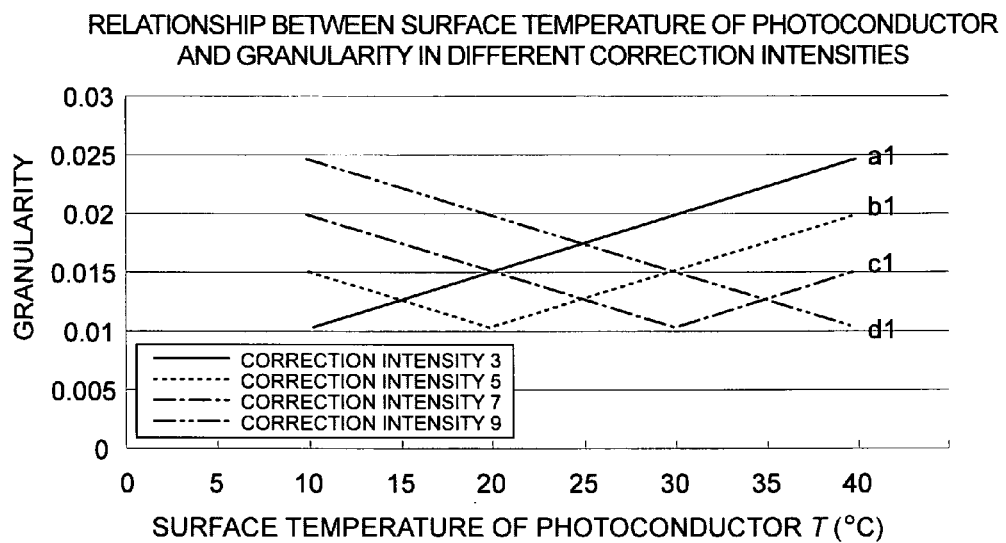
FIG. 6 is a diagram showing how a correction for the surface temperature of photoconductor affects the granularity of image.

3) The surface temperature of photoconductor. FIG. 6 is a diagram showing how a correction for the surface temperature of photoconductor affects the granularity of image. The vertical axis shows the granularity and the horizontal axis shows the surface temperature of photoconductor. A line with reference numeral a1, b1, c1, or d1 shows each relationship between the granularity with a correction intensity of 3, 5, 7, or 9 and the surface temperature of photoconductor. The larger the correction intensity value is, the more intensively the correction is applied.

The printed image becomes coarser when the granularity value becomes larger, and the printed image becomes finer when the granularity value becomes smaller. For this reason, the uneven densities or streaks appearing in the printed image tend to become conspicuous and easily recognizable by human eyes when the granularity value is large. According to FIG. 6, it is understood that an image formed by a photoconductor having a higher surface temperature is prone to have a higher granularity and develop uneven densities or streaks unless the correction intensity is increased. By contrast, an image formed by a photoconductor having a lower surface temperature will have a higher granularity and develop an identical problem if the correction intensity is increased. In other words, pixels printed by using a photoconductor having a higher surface temperature tend to develop the uneven densities or streaks easily.

Figure 7:
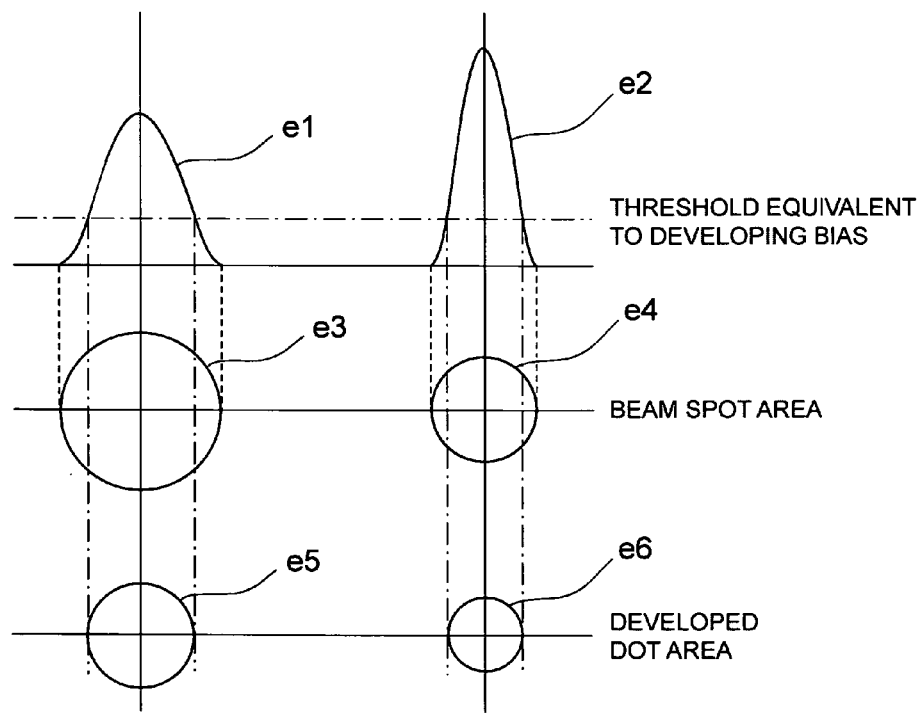
FIG. 7 is a schematic diagram showing a relationship between the exposure energy of light-emitting element and its dot area.

4) The developing bias voltage. General outlines of the influence by the developing bias voltage are explained with reference to FIG. 7. FIG. 7 is a schematic diagram showing a relationship between the exposure energy of light-emitting element and its dot area. Curved lines e1 and e2 show the exposure energy, curved lines e3 and e4 show exposure beam spot areas, and curved lines e5 and e6 show dot areas of images developed by applying a predetermined developing bias voltage. It is assumed that the amounts of energy (areas enclosed by the curved lines) shown by the exposure energy curved lines e1 and e2 are identical. It is understood from FIG. 7 that the exposure beams spot areas are different between the two because of variations of the light-emitting elements and the lens array 32, even if the both of them have the identical exposure energy (light quantity). Moreover, the dot areas of image being developed, as shown by the curved lines e5 and e6, are different according to the developing bias voltage applied at the time of development process.

Figure 8:
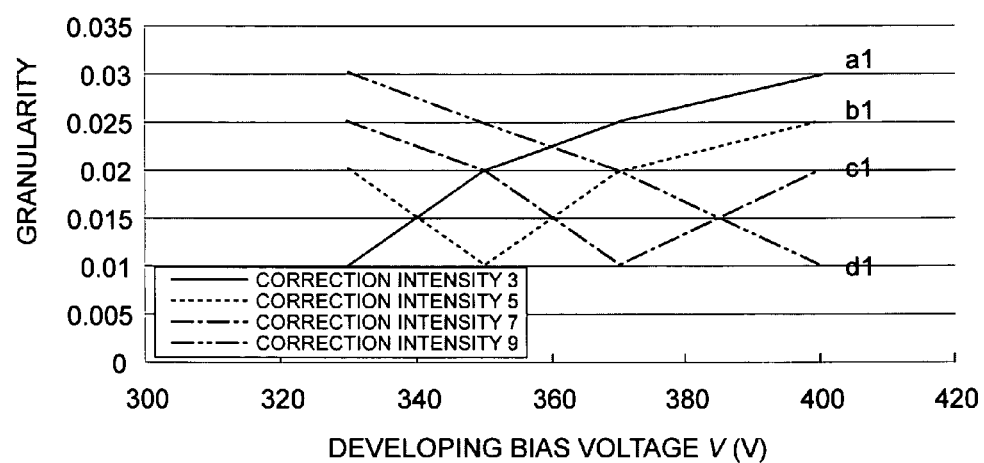
FIG. 8 is a diagram showing how a correction for the developing bias voltage affects the granularity of image.

FIG. 8 is a diagram showing how a correction for the developing bias voltage affects the granularity of image. The vertical axis shows the granularity and the horizontal axis shows the developing bias voltage. A line with reference numeral a1, b1, c1, or d1 shows each relationship between the granularity with a correction intensity of 3, 5, 7, or 9 and the developing bias voltage. The larger the correction intensity value is, the more intensively the correction is applied.

The printed image becomes coarser when the granularity value becomes larger, and the printed image becomes finer when the granularity value is smaller. For this reason, the uneven densities or streaks appearing in the printed image tend to become conspicuous and easily recognizable by human eyes when the granularity value is large. According to FIG. 8, it is understood that an image developed by applying a higher developing bias voltage is prone to have a higher granularity and develop uneven densities or streaks unless the correction intensity is increased. By contrast, an image developed by applying a higher developing bias voltage will have a higher granularity and develop an identical problem if the correction intensity is increased. In other words, pixels developed by applying a higher developing bias voltage tend to develop the uneven densities or streaks easily.

Figure 9:
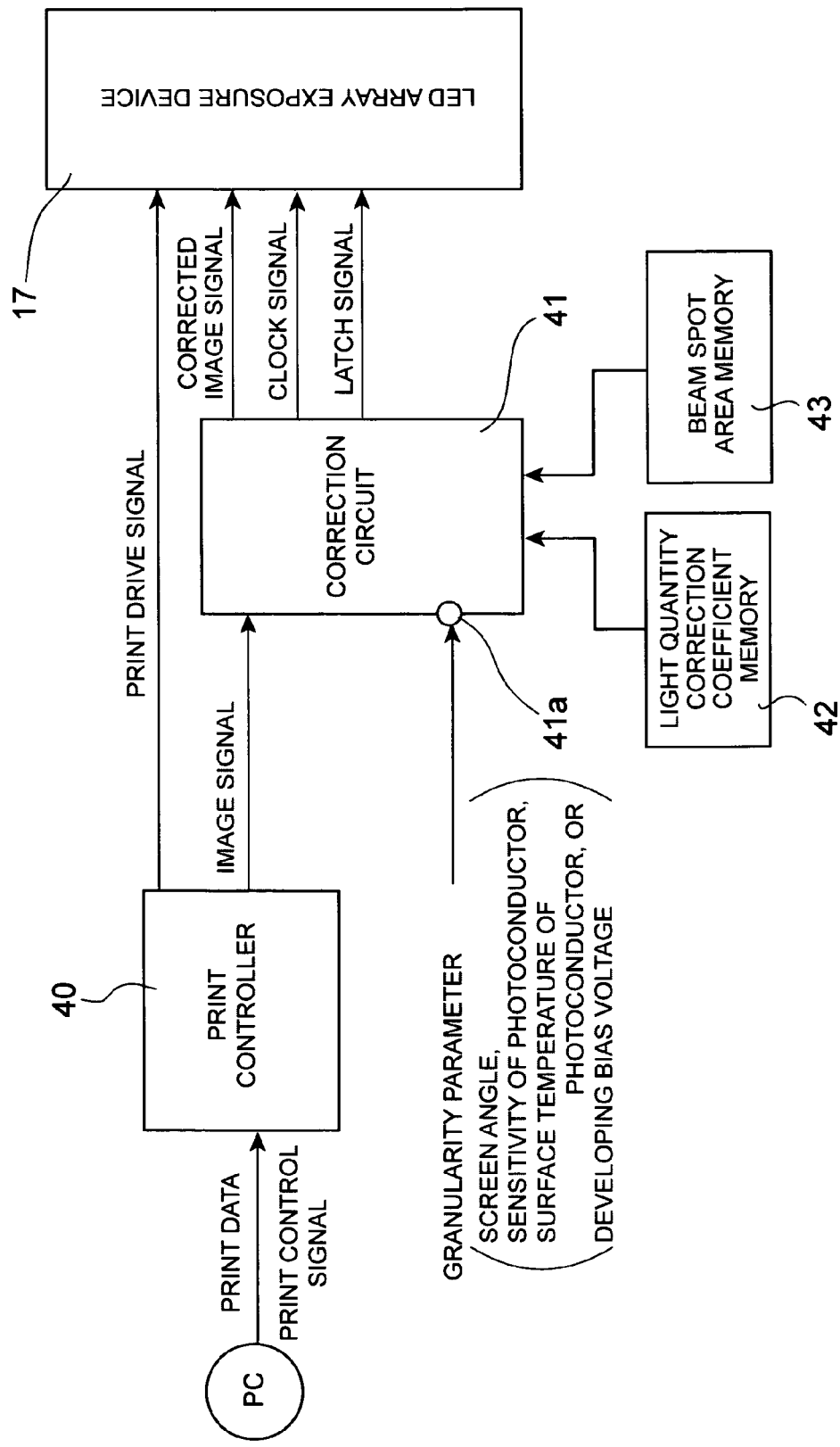
FIG. 9 is a block diagram showing a simplified circuit of the color printer 11 in which the light-emitting elements are compensated for variations and driven accordingly.

Next, how to control the LED array exposure device 17 by applying the granularity parameter will be described with reference to FIG. 9. FIG. 9 is a block diagram showing a simplified circuit of the color printer 11 in which the light-emitting elements are compensated for variations and driven accordingly. The circuit comprises a print controller 40, a correction circuit 41 for making corrections, a light quantity correction coefficient memory 42 for memorizing the light quantity correction coefficients, a beam spot area memory 43 for memorizing the beam spot areas, and the LED array exposure device 17. Additionally, a PC is an information processing apparatus such as, for example, a personal computer.

According to a configuration shown in FIG. 9, first, print data rasterized (disassembled into pixels) by the PC are fed to the print controller 40 together with a print control signal. By receiving these, the print controller 40 feeds out an image signal, for example, for every scan line, to the correction circuit 41 and, at the same time, also feeds out a print drive signal to the LED array exposure device 17 to start printing. The correction circuit 41 has a parameter input terminal 41a to which the granularity parameter is input. This parameter input terminal 41a receives one of the aforementioned screen angle of image, sensitivity of photoconductor, surface temperature of photoconductor, and developing bias voltage.

When the granularity parameter is the screen angle, because the print data includes information regarding the screen angle, the screen angle for each pixel is fed to the parameter input terminal 41a through the print controller 40 from the PC.

When the granularity parameter is the sensitivity of photoconductor, the sensitivity of photoconductor is input by way of an operation on an unillustrated operation section of the color printer 11 when the photoconductor is fitted or replaced, and the sensitivity of photoconductor is memorized in an unillustrated memory provided in the color printer 11. It is also possible to input the sensitivity of photoconductor by way of a printer driver program and memorize it in the memory. Thereafter, thus memorized sensitivity of photoconductor is fed to the input terminal 41a when the control is performed.

When the granularity parameter is the surface temperature of photoconductor, for example, by installing an unillustrated temperature sensor in close proximity to the surface of each photoconductor 15 shown in FIG. 1, the changing temperature outputted from the sensor is converted from analog to digital data and fed to the parameter input terminal 41a.

When the granularity parameter is the developing bias voltage, the developing bias voltage applied to an unillustrated developing roller in the developing unit 14 of the color printer 11 shown in FIG. 1 is converted from analog to digital data and fed to the parameter input terminal 41a.

When the correction circuit 41 receives one of the above-mentioned granularity parameters and the image signal, the correction circuit 41, based on the pixel data included in the image signal, reads from the light quantity correction coefficient memory 42 and the beam spot area memory 43 the light quantity correction coefficient and the beam spot area for the light-emitting element corresponding to the pixel respectively. Thereafter, the correction circuit 41, by performing a correction in such a way as will be described later by using one of the aforementioned parameters, feeds the resultant signal as a corrected image signal for driving the light-emitting element to the LED array exposure device 17 together with a clock signal for timing the lighting. Here, the amount of the corrected image signal to be fed is either for one scan line or for one scan block that is a division of one scan line. A latch signal is also fed out to the LED array exposure device 17 so that the LED array exposure device 17 latches that amount of corrected image signal and emits light simultaneously.

Next, as correction methods of the LED array exposure device 17 for the aforementioned parameters, a first and a second correction methods will be described with reference to FIG. 9 to FIG. 11. Although, in the interest of clarity, the granularity parameters are exemplified by the screen angle of pixel in the following descriptions, it is possible to replace the screen angle of pixel and parts relating thereto with the sensitivity of photoconductor, the surface temperature of photoconductor, or the developing bias voltage. In addition, a large or a small screen angle corresponds to a high or a low sensitivity of photoconductor, a high or a low surface temperature of photoconductor, and a high or a low developing bias voltage respectively.

<First Correction Method>

As explained before, according to the present invention, along with the conventional correction for the light quantity and for the beam spot area, the correction for the granularity parameter is performed. The first correction method of such a correction is described with reference to FIG. 10. FIG. 10 is a flowchart-type schematic diagram showing the first correction method relating to the present invention to be performed in driving each light-emitting element. To simplify the descriptions, one correction group is assumed to be composed of five light-emitting elements. However, it is desirable that one correction group comprise one LED array chip or 32 to 256 light-emitting elements in actual cases.

In FIG. 10, in the first step S1, pixel data to be printed are taken into the correction circuit 41. Here, a first pixel is pixel #1 and pixels up to pixel #5 are shown. In the next step S2, the screen angle S for each of the pixels #1 to #5 is read. Usually, the screen angles for a particular color within a page to be printed are identical and this example shows a screen angle set at 90 degrees. In S3, the light quantity correction coefficient L of the light-emitting element corresponding to each pixel is read. In S4, the beam spot area A of the light-emitting element corresponding to each pixel is read. In S5, an average value M of the beam spot areas of pixel #1 to #5 is calculated. In S6, a difference D (M−A) between the average value M and the beam spot area A for each pixel is calculated. Furthermore, in S7, a ratio P (D/M) of each difference D to the average value M is calculated.

The larger an absolute value of the ratio P obtained in this way is, the more the beam spot area A of the light-emitting element corresponding to that pixel varies from the average of the group. Because of this reason, in S8, the ratio P obtained as above is weighted for correction. Coefficients required for correcting for the ratio P to the degree corresponding to the weight thereof should be obtained through a separate test. Thus obtained coefficient is called a beam spot area correction coefficient B. In the next step S9, the screen angle S for the pixel is read and finally a correction coefficient C is obtained through a process of assigning a weight according to the screen angle S (a process of screen angle correction coefficient calculation) so that a stronger correction is applied if the screen angle S is larger or a weaker correction is applied if the screen angle S is smaller as explained before. Finally, in step S10, a standard driving current for the light-emitting elements is multiplied by the light quantity correction coefficient L for each pixel and further multiplied by the correction coefficient C obtained as mentioned above so as to produce a driving current I for each light-emitting element.

Because the light-emitting element of the LED array exposure device 17 is corrected with consideration given to the influence of the lens array 32 for variations appearing in the observed image which is affected by the light quantity, the beam spot area, or the screen angle, it is possible to achieve a substantial reduction in the occurrence of the uneven densities or streaks. In the example explained above, because the correction is performed for each light-emitting element within a group consisting of five by averaging the group, the pixels are printed uniformly if the average values between the groups are almost identical. However, if the average value differs from group to group, it is possible to obtain more effective results by employing the following method.

<Second Correction Method>

FIG. 11 is a flowchart-type schematic diagram showing the second correction method relating to the present invention to be performed in driving each light-emitting element. To simplify the descriptions, one correction group is assumed to be composed of five light-emitting elements. However, it is desirable that one correction group comprise one LED array chip or 32 to 256 light-emitting elements in actual cases.

In FIG. 11, in the first step S21, N pieces of pixel data for each scan line or scan block (e.g., an LED array chip as a unit) to be printed are taken into the correction circuit 41. The pixels are numbered from #1 to #N and a particular pixel is pixel #n. In S21, the pixels from the first pixel #1 to pixel #9 are shown in the drawing. In the next step S22, the screen angle S corresponding to the pixel already taken is read. Usually, the screen angles for a particular color within a page to be printed are identical and this example shows a screen angle set at 90°. In S23, the light quantity correction coefficient L of the light-emitting element corresponding to each pixel is read. In S24, the beam spot area A of the light-emitting element corresponding to each pixel is read. In S25-1, by making pixel #1 a targeted pixel, an average value M1 of the beam spot areas A for pixel #1 to #5 is calculated. In S25-2, by making pixel #2 a targeted pixel, an average value M2 of the beam spot areas A for pixel #2 to #6 is calculated. In S25-3, by making pixel #3 a targeted pixel, an average value M3 of the beam spot areas A for pixel #3 to #7 is calculated. In S25-4, by making pixel #4 a targeted pixel, an average value M4 of the beam spot areas A for pixel #4 to #8 is calculated. In S25-5, by making pixel #5 a targeted pixel, an average value M5 of the beam spot areas A for pixel #5 to #9 is calculated. In the same manner, the average values Mn are obtained until the targeted pixel becomes pixel #N.

In actual cases, the light-emitting elements are laid beyond the effective scanning width. Therefore, if the average value M is to be obtained by making the last pixel #N a targeted pixel within the effective scanning width, it is possible to use the light-emitting elements laid beyond the effective scanning width. Alternatively, it is also possible to reduce a sampling number for calculating the average value M for a region including the last pixel. In S26, a difference Dn (Mn−An) between the average value Mn for the targeted pixel #n and the beam spot area An of that pixel is calculated. Furthermore, in S27, a ratio Pn (Dn/Mn) of the difference Dn to the average value Mn is calculated.

The larger an absolute value of the ratio Pn obtained in this way is, the more the beam spot area An of the light-emitting element corresponding to that pixel varies from the average of the group. Because of this reason, in S28, the ratio Pn obtained as above is weighted for correction. Coefficients required for correcting for the ratio Pn to the degree corresponding to the weight thereof should be obtained through a separate test. Thus obtained coefficient is called a beam spot area correction coefficient Bn. In the next step S29, the screen angle S of the pixel is read and finally a correction coefficient Cn is obtained through a process of assigning weights according to the screen angle S (a process of screen angle correction coefficient calculation) so that a stronger correction is applied if the screen angle S is larger or a weaker correction is applied if the screen angle S is smaller as explained before. Finally, in step S30, a standard driving current for the light-emitting elements is multiplied by the light quantity correction coefficient Ln for each pixel and further multiplied by the correction coefficient Cn obtained in step S29 so as to produce a driving current In for each light-emitting element.

In the above-mentioned method, by using an average value (moving average) of a moving group based on the targeted pixel, the light-emitting element of the LED array exposure device 17 is corrected with consideration given to the influence of the lens array 32 for variations appearing in the observed image which is affected by the light quantity, the beam spot area, or the screen angle. Because the correction is based on the moving average, it is possible to make lenient continuous corrections and thus further reduce the occurrence of the uneven densities or streaks.

The aforementioned first and second correction methods are for the correction when the granularity parameter influences images regardless of a gray level of pixel. By analyzing the images thoroughly, there may be cases in which the degree of the influence differs depending on the gray level of pixel. A concept in controlling the exposure energy of the light-emitting element by a driving current and a lighting time is described with reference to FIG. 12A to FIG. 12C.

Figure 12A:
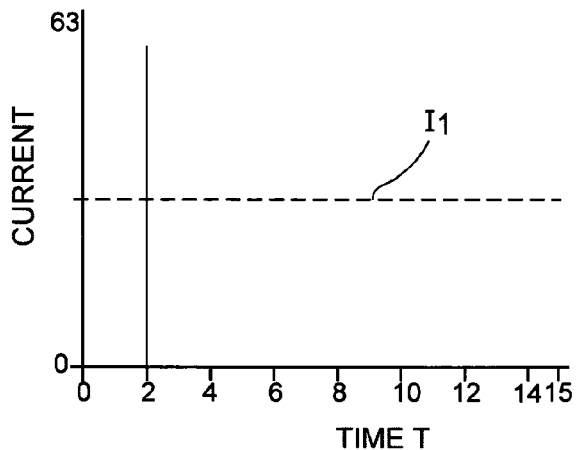
FIG. 12A, showing one of prior arts in which no correction is performed, is a schematic diagram showing a relationship between a driving current and a lighting time when the light-emitting element is driven by a standard driving current and emits light for a predetermined period of time.
Figure 12B:
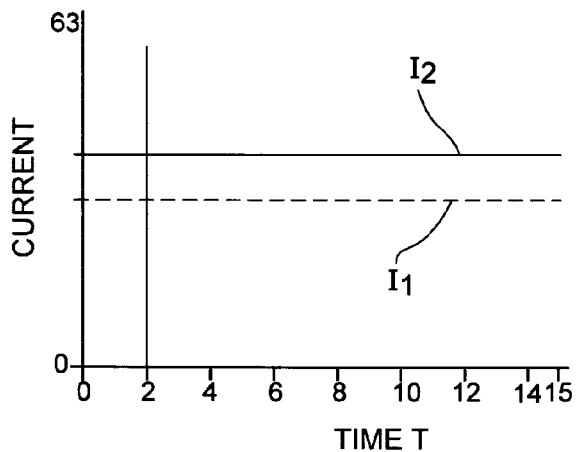
FIG. 12B, showing another of prior arts in which a correction is performed, is a schematic diagram showing a relationship between a driving current and a lighting time when the light-emitting element is driven by a driving current corrected for variations of light quantity and emits light for a period of time corresponding to the gray level of pixel.
Figure 12C:
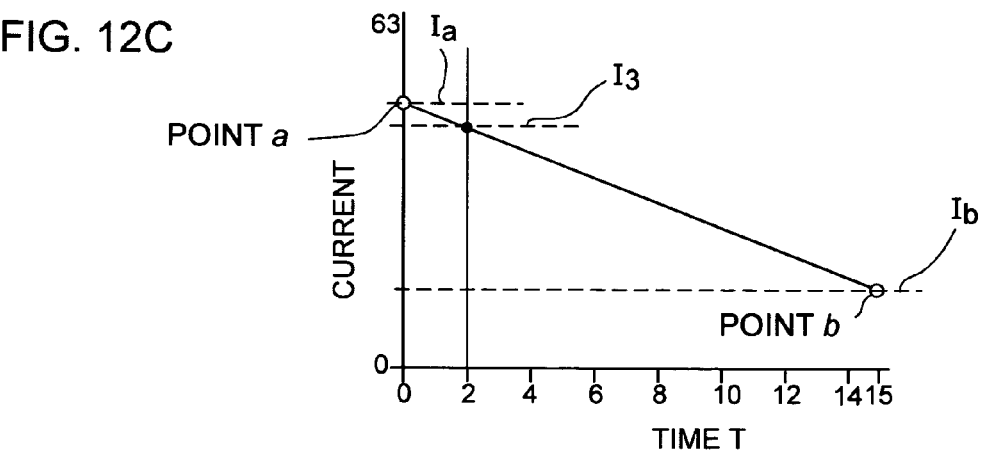
FIG. 12C is a schematic diagram showing a control method in which corrections are made at two points for the light quantity, the beam spot area, and the image granularity parameter so as to obtain a corrected driving current from the two points by using linear interpolation in order to drive each light-emitting element and turn it on for a duration corresponding to the gray level of pixel.

FIG. 12A, showing one of prior arts in which no correction is performed, is a schematic diagram showing a relationship between a driving current and a lighting time when the light-emitting element is driven by a standard driving current and emits light for a predetermined length of time. FIG. 12B, showing another of prior arts in which a correction is performed, is a schematic diagram showing a relationship between a driving current and a lighting time when the light-emitting element is driven by a driving current corrected for variations of light quantity and emits light for a length of time corresponding to the gray level of pixel. FIG. 12C is a schematic diagram showing a control method in which corrections are performed at two points for the light quantity, the beam spot area, and the image granularity parameter so as to obtain a corrected driving current from the two points by using linear interpolation in order to drive each light-emitting element and turn it on for a duration corresponding to the gray level of pixel. These illustrations show examples in which a pixel has 4 bits as 16-gray level data, and the light-emitting element corresponding to this pixel emits light in 16 lengths of time (horizontal axis). Moreover, These illustrations show the examples in which the light-emitting element is controlled by a driving current comprising 6-bit data, that is, 64 levels of current (vertical axis).

As shown in FIG. 12A, when a correction is not performed for the variation of each light-emitting element, all of the light-emitting elements are driven by an identical standard driving current I1 for a duration corresponding to the gray level specific to the pixel (time 2 in the illustrated example). However, in order to cope with the variation of light quantity of each light-emitting element, as shown in FIG. 12B, the light-emitting element is driven by current I2 corrected for light quantity as opposed to the standard driving current I1, for the duration corresponding to the gray level of the pixel. Consequently, the current I2 corrected for light quantity is different for each light-emitting element. The example shown in FIG. 12B is effective for the problem caused by the variation of light quantity.

As described before, due to variations or fitting errors of the lens array 32, the beam spot area varies when the beam forms an image. For this reason, a correction for the beam sport area is also necessary. In addition, if the image granularity is large, then the uneven densities or streaks become conspicuous. The magnitude of the granularity is also affected by the gray level of pixel. Therefore, when the gray level of pixel has a significant impact, then a correction for the granularity parameter in accordance with the gray level of pixel becomes necessary.

FIG. 12C shows a control method, embodying the present invention, in which a correction is made for the granularity parameter in accordance with the gray level of pixel at two points, a low gray level and a high gray level (driving currents Ia and Ib at points a and b respectively in the drawing) and a driving current is obtained by using linear interpolation from these two points. According to the example shown in FIG. 12C, the light-emitting element is driven by a corrected driving current I3 for the duration (time 2) corresponding to the gray level of the pixel.

As mentioned before, the factors that affect the granularity of image include the screen angle of pixel, the sensitivity of photoconductor, the surface temperature of photoconductor, and the developing bias voltage. These granularity parameters will be described below.

Figure 13A:
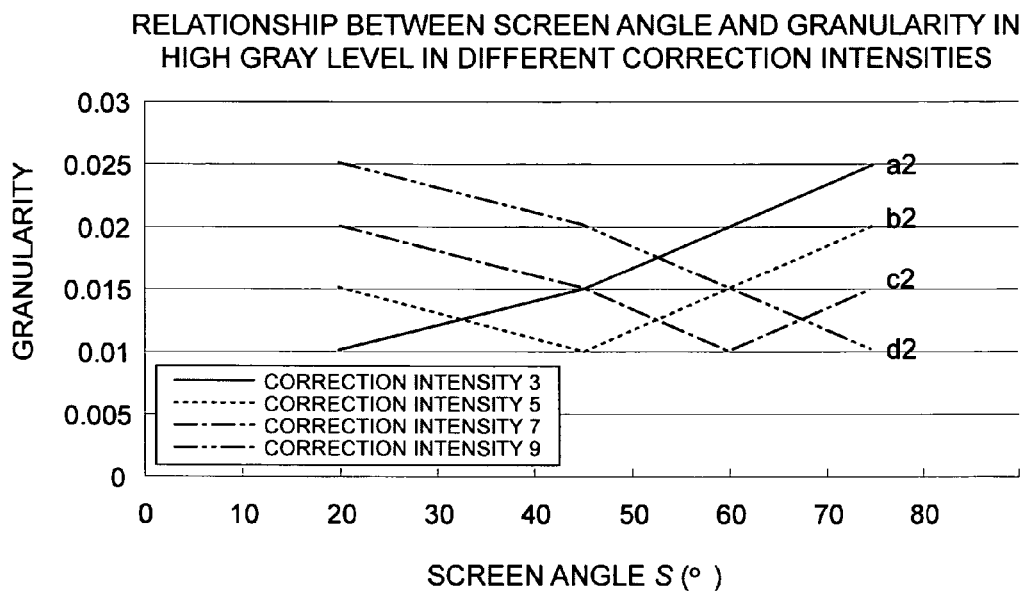
FIG. 13A is a diagram showing a relationship between the screen angle and the granularity of image when the pixel has a high gray level.
Figure 13B:
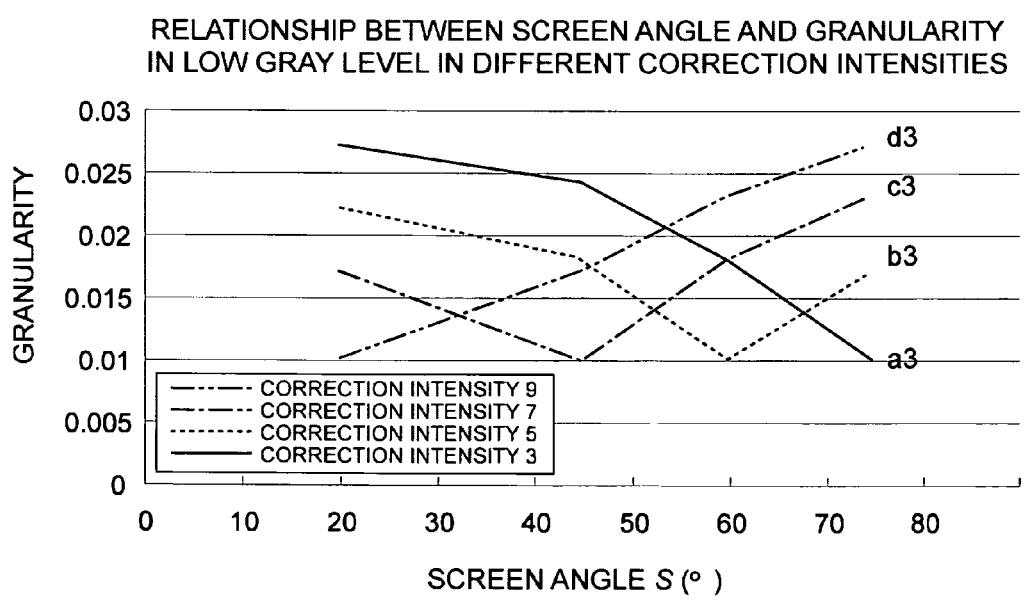
FIG. 13B is a diagram showing a relationship between the screen angle and the granularity of image when the pixel has a low gray level.

1) The screen angle of pixel. FIG. 13A is a diagram showing a relationship between the screen angle and the granularity of image when the pixel has a high gray level. By contrast, FIG. 13B is a diagram showing a relationship between the screen angle and the granularity of image when the pixel has a low gray level. In these illustrations, the vertical axis shows the granularity and the horizontal axis shows the screen angle (°). A line with reference numeral a2, b2, c2, or d2 shows a relationship between the granularity and the screen angle for a high gray level when a correction intensity of 3, 5, 7, or 9 is applied respectively and a line with reference numeral a3, b3, c3, or d3 shows a relationship between the granularity and the screen angle for a low gray level when a correction intensity of 3, 5, 7, or 9 is applied respectively. The larger the correction intensity value is, the more intensively the correction is applied.

The printed image becomes coarser when the granularity value becomes larger, and the printed image becomes finer when the granularity value becomes smaller. For this reason, the uneven densities or streaks appearing in the printed image tend to become conspicuous and easily recognizable by human eyes when the granularity value is large. According to FIG. 13A, it is understood that a pixel having a higher gray level and a larger screen angle is prone to produce a larger granularity and develop uneven densities or streaks unless the correction intensity is increased. By contrast, a pixel having a higher gray level and a smaller screen angle will produce a larger granularity and develop an identical problem if the correction intensity is increased. In other words, pixels having a higher gray level and printed at a larger screen angle tend to develop uneven densities or streaks easily.

When a pixel having a lower gray level is printed as shown in FIG. 13B, it is understood that a pixel having a larger screen angle is prone to produce a larger granularity and develop uneven densities or streaks unless the correction intensity is decreased. By contrast, a pixel having a smaller screen angle will produce a larger granularity and develop an identical problem if the correction intensity is decreased. In other words, pixels having a lower gray level and printed at a smaller screen angle tend to develop uneven densities or streaks that are easily recognized.

As explained, it is understood that a correction appropriate for the screen angle should be chosen according to the gray level of pixel. For example, judging from FIG. 13A and FIG. 13B, when the screen angle is large, the correction intensity 9 shown in FIG. 13A and the correction intensity 3 shown in FIG. 13B should be selectively applied for a pixel having a higher gray level and a pixel having a lower gray level respectively so as to minimize the granularity in both of the cases. When the screen angle is smaller, the correction intensity 3 shown in FIG. 13A and the correction intensity 9 shown in FIG. 13B should be selectively applied for a pixel having a higher gray level and a pixel having a lower gray level respectively so as to minimize the granularity in both of the cases.

For this reason, as shown in FIG. 12C, correction values are obtained in consideration of the screen angel at two points, a low gray level and a high gray level (point a and point b in the drawing), respectively. Next, a corrected driving current 13 is calculated by using linear interpolation from these two points in accordance with the gray level of pixel (time 2 in the example).

Figure 14A:
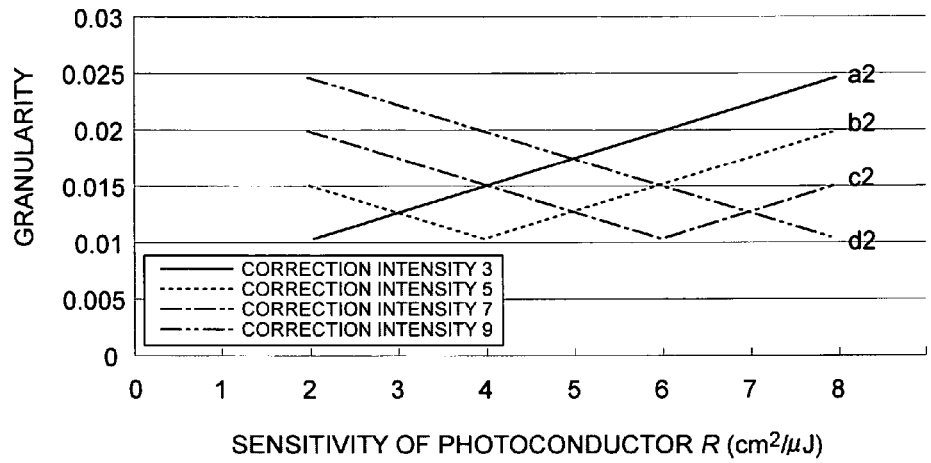
FIG. 14A is a diagram showing a relationship between the sensitivity of photoconductor and the granularity of image when the pixel has a higher gray level.
Figure 14B:
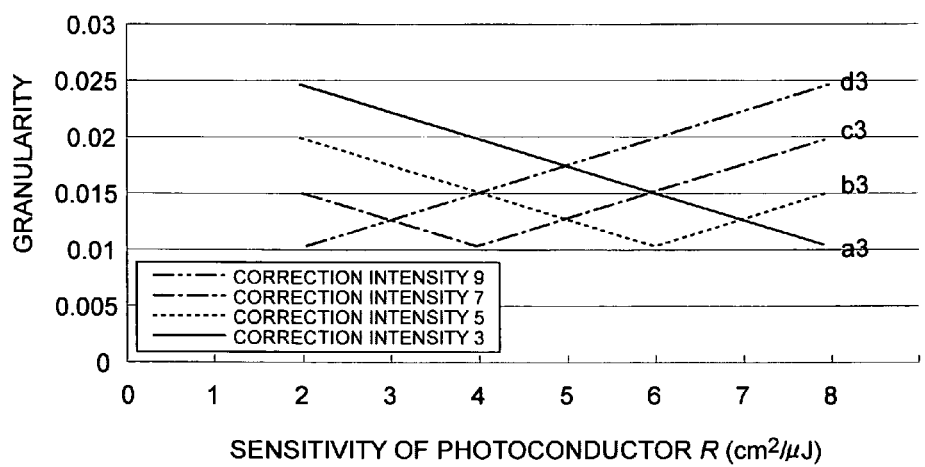
FIG. 14B is a diagram showing a relationship between the sensitivity of photoconductor and the granularity of image when the pixel has a lower gray level.

2) The sensitivity of photoconductor. FIG. 14A is a diagram showing a relationship between the sensitivity of photoconductor and the granularity of image when the pixel has a higher gray level. By contrast, FIG. 14B is a diagram showing a relationship between the sensitivity of photoconductor and the granularity of image when the pixel has a lower gray level. In these illustrations, the vertical axis shows the granularity and the horizontal axis shows the sensitivity of photoconductor ($cm^2/\mu J$). A line with reference numeral a2, b2, c2, or d2 shows a relationship between the granularity and the sensitivity of photoconductor for a higher gray level when a correction intensity of 3, 5, 7, or 9 is applied respectively and a line with reference numeral a3, b3, c3, or d3 shows a relationship between the granularity and the sensitivity of photoconductor for a lower gray level when a correction intensity of 3, 5, 7, or 9 is applied respectively. The larger the correction intensity value is, the more intensively the correction is applied.

The printed image becomes coarser when the granularity value becomes larger, and the printed image becomes finer when the granularity value becomes smaller. For this reason, the uneven densities or streaks appearing in the printed image tend to become conspicuous and easily recognizable by human eyes when the granularity value is large. According to FIG. 14A, it is understood that a pixel having a higher gray level when printed by using a photoconductor having a higher sensitivity is prone to produce a larger granularity and develop uneven densities or streaks unless the correction intensity is increased. By contrast, a pixel having a higher gray level when printed by using a photoconductor having a lower sensitivity will produce a larger granularity and develop an identical problem if the correction intensity is increased. In other words, pixels having a higher gray level and printed by using a photoconductor having a higher sensitivity tend to develop uneven densities or streaks easily.

When a pixel having a lower gray level is printed as shown in FIG. 14B, it is understood that a pixel when printed by using a photoconductor having a higher sensitivity is prone to produce a larger granularity and develop uneven densities or streaks unless the correction intensity is decreased. By contrast, a pixel when printed by using a photoconductor having a lower sensitivity will produce a larger granularity and develop an identical problem if the correction intensity is decreased. In other words, pixels having a lower gray level and printed by using a photoconductor having a lower sensitivity tend to develop uneven densities or streaks that are easily recognized.

As explained, it is understood that a correction appropriate for the sensitivity of photoconductor should be chosen according to the gray level of pixel. For example, judging from FIG. 14A and FIG. 14B, when a photoconductor having a higher sensitivity is used, the correction intensity 9 shown in FIG. 14A and the correction intensity 3 shown in FIG. 14B should be selectively applied for a pixel having a higher gray level and a pixel having a lower gray level respectively so as to minimize the granularity in both of the cases. When the sensitivity of photoconductor is lower, the correction intensity 3 shown in FIG. 14A and the correction intensity 9 shown in FIG. 14B should be selectively applied for a pixel having a higher gray level and a pixel having a lower gray level respectively so as to minimize the granularity in both of the cases.

Figure 15A:
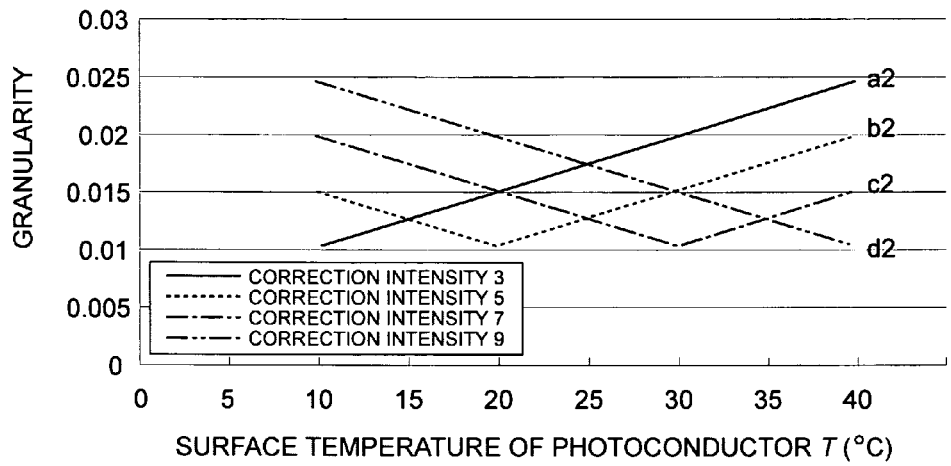
FIG. 15A is a diagram showing a relationship between the surface temperature of photoconductor and the granularity of image when the pixel has a higher gray level.
Figure 15B:
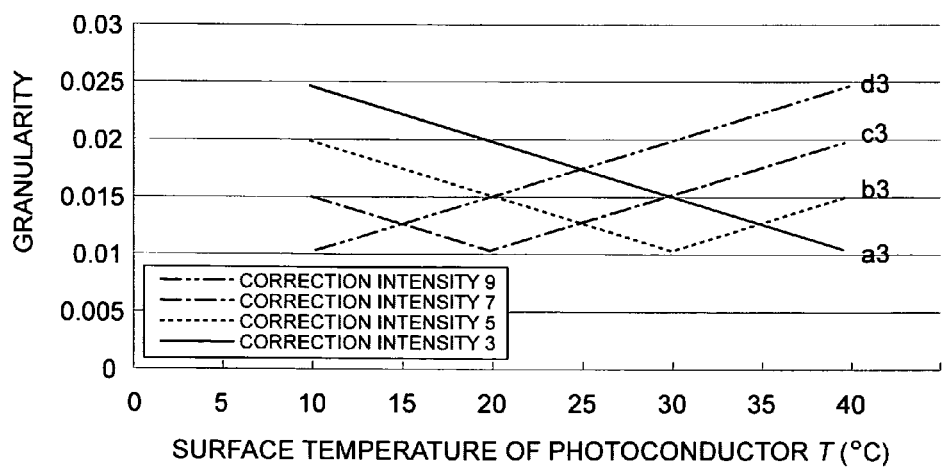
FIG. 15B is a diagram showing a relationship between the surface temperature of photoconductor and the granularity of image when the pixel has a lower gray level.

2) The surface temperature of photoconductor. FIG. 15A is a diagram showing a relationship between the surface temperature of photoconductor and the granularity of image when the pixel has a higher gray level. By contrast, FIG. 15B is a diagram showing a relationship between the surface temperature of photoconductor and the granularity of image when the pixel has a lower gray level. In these illustrations, the vertical axis shows the granularity and the horizontal axis shows the surface temperature of photoconductor (° C.). A line with reference numeral a2, b2, c2, or d2 shows a relationship between the granularity and the surface temperature of photoconductor for a higher gray level when a correction intensity of 3, 5, 7, or 9 is applied respectively and a line with reference numeral a3, b3, c3, or d3 shows a relationship between the granularity and the surface temperature of photoconductor for a lower gray level when a correction intensity of 3, 5, 7, or 9 is applied respectively. The larger the correction intensity value is, the more intensively the correction is applied.

The printed image becomes coarser when the granularity value is larger, and the printed image becomes finer when the granularity value is smaller. For this reason, the uneven density or streaks appearing in the printed image tend to become conspicuous and easily recognizable by human eyes when the granularity value is large. According to FIG. 15A, it is understood that a pixel having a higher gray level when printed by using a photoconductor having a higher surface temperature is prone to produce a larger granularity and develop uneven densities or streaks unless the correction intensity is increased. By contrast, a pixel having a higher gray level when printed by using a photoconductor having a lower surface temperature will produce a larger granularity and develop an identical problem if the correction intensity is increased. In other words, pixels having a higher gray level and printed by using a photoconductor having a higher surface temperature tend to develop uneven densities or streaks easily.

When a pixel having a lower gray level is printed as shown in FIG. 15B, it is understood that a pixel when printed by using a photoconductor having a higher surface temperature is prone to produce a larger granularity and develop uneven densities or streaks unless the correction intensity is decreased. By contrast, a pixel when printed by using a photoconductor having a lower surface temperature will produce a larger granularity and develop an identical problem if the correction intensity is decreased. In other words, pixels having a lower gray level and printed by using a photoconductor having a lower surface temperature tend to develop uneven densities or streaks that are easily recognized.

As explained, it is understood that a correction appropriate for the surface temperature of photoconductor should be chosen according to the gray level of pixel. For example, judging from FIG. 15A and FIG. 15B, when a photoconductor having a higher surface temperature is used, the correction intensity 9 shown in FIG. 15A and the correction intensity 3 shown in FIG. 15B should be selectively applied for a pixel having a higher gray level and a pixel having a lower gray level respectively so as to minimize the granularity in both of the cases. When the surface temperature of photoconductor is lower, the correction intensity 3 shown in FIG. 15A and the correction intensity 9 shown in FIG. 15B should be selectively applied for a pixel having a higher gray level and a pixel having a lower gray level respectively so as to minimize the granularity in both of the cases.

Figure 16A:
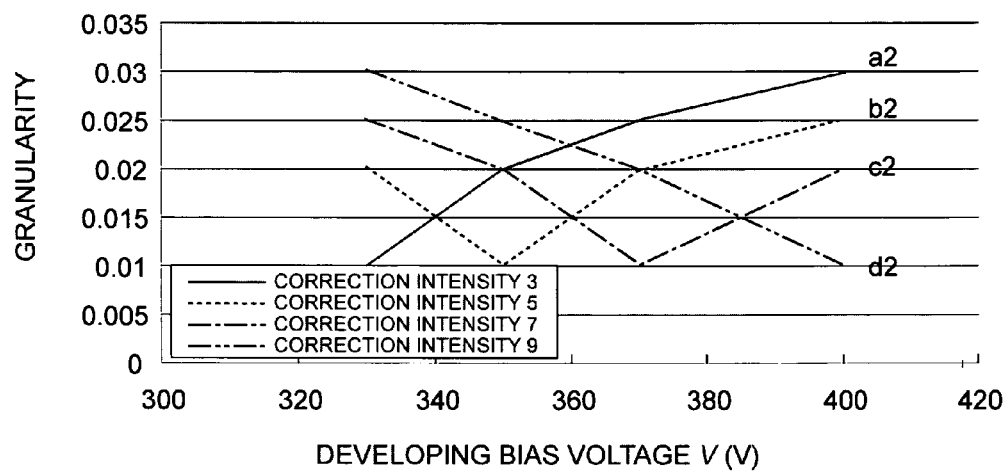
FIG. 16A is a diagram showing a relationship between the developing bias voltage and the granularity of image when the pixel has a higher gray level.
Figure 16B:
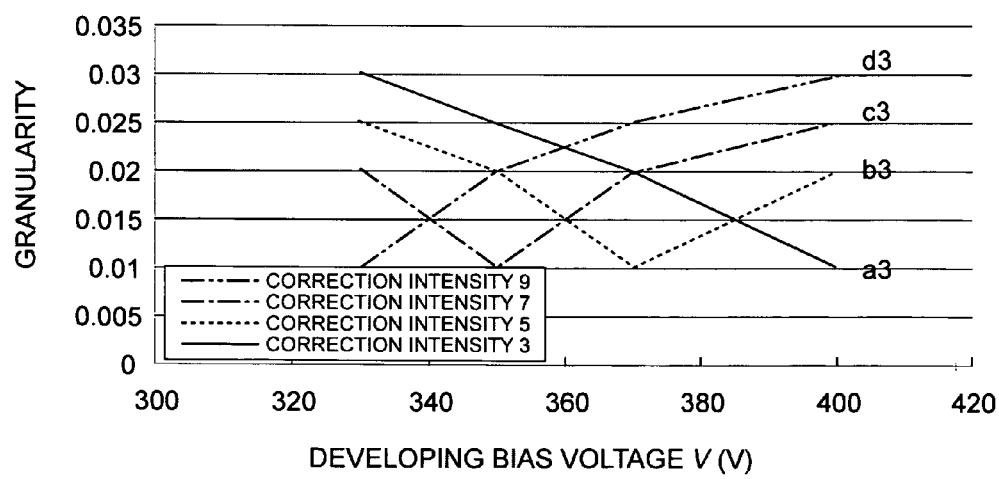
FIG. 16B is a diagram showing a relationship between the developing bias voltage and the granularity of image when the pixel has a lower gray level.

The developing bias voltage. FIG. 16A is a diagram showing a relationship between the developing bias voltage and the granularity of image when the pixel has a higher gray level. By contrast, FIG. 16B is a diagram showing a relationship between the developing bias voltage and the granularity of image when the pixel has a lower gray level. In these illustrations, the vertical axis shows the granularity and the horizontal axis shows the developing bias voltage (V). A line with reference numeral a2, b2, c2, or d2 shows a relationship between the granularity and the developing bias voltage for a higher gray level when a correction intensity of 3, 5, 7, or 9 is applied respectively and a line with reference numeral a3, b3, c3, or d3 shows a relationship between the granularity and the developing bias voltage for a lower gray level when a correction intensity of 3, 5, 7, or 9 is applied respectively. The larger the correction intensity value is, the more intensively the correction is applied.

The printed image becomes coarser when the granularity value is larger, and the printed image becomes finer when the granularity value is smaller. For this reason, the uneven densities or streaks appearing in the printed image tend to become conspicuous and easily recognizable by human eyes when the granularity value is large. According to FIG. 16A, it is understood that a pixel having a higher gray level when developed by using a higher developing bias voltage is prone to produce a larger granularity and develop uneven densities or streaks unless the correction intensity is increased. By contrast, a pixel having a higher gray level when developed by using a lower developing bias voltage will produce a larger granularity and develop an identical problem if the correction intensity is increased. In other words, pixels having a higher gray level and developed by using a higher developing bias voltage tend to develop uneven densities or streaks easily.

When a pixel having a lower gray level is printed as shown in FIG. 16B, it is understood that a pixel when developed by using a higher developing bias voltage is prone to produce a larger granularity and develop uneven densities or streaks unless the correction intensity is decreased. By contrast, a pixel when developed by using a lower developing bias voltage will produce a larger granularity and develop an identical problem if the correction intensity is decreased. In other words, pixels having a lower gray level and developed by using a lower developing bias voltage tend to develop uneven densities or streaks that are easily recognized.

As explained, it is understood that a correction appropriate for the developing bias voltage should be chosen according to the gray level of pixel even if the same developing bias voltage is applied to a developing roller. For example, judging from FIG. 16A and FIG. 16B, when a developing process is performed with an application of a higher developing bias voltage, the correction intensity 9 shown in FIG. 16A and the correction intensity 3 shown in FIG. 16B should be selectively applied for a pixel having a higher gray level and a pixel having a lower gray level respectively so as to minimize the granularity in both of the cases. When a developing process is performed with an application of a lower developing bias voltage, the correction intensity 3 shown in FIG. 16A and the correction intensity 9 shown in FIG. 16B should be selectively applied for a pixel having a higher gray level and a pixel having a lower gray level respectively so as to minimize the granularity in both of the cases.

Next, how to control the LED array exposure device 17 by adding a correction for the granularity parameter when a pixel has a higher gray level and when a pixel has a lower gray level will be described with reference to FIG. 17.

Figure 17:
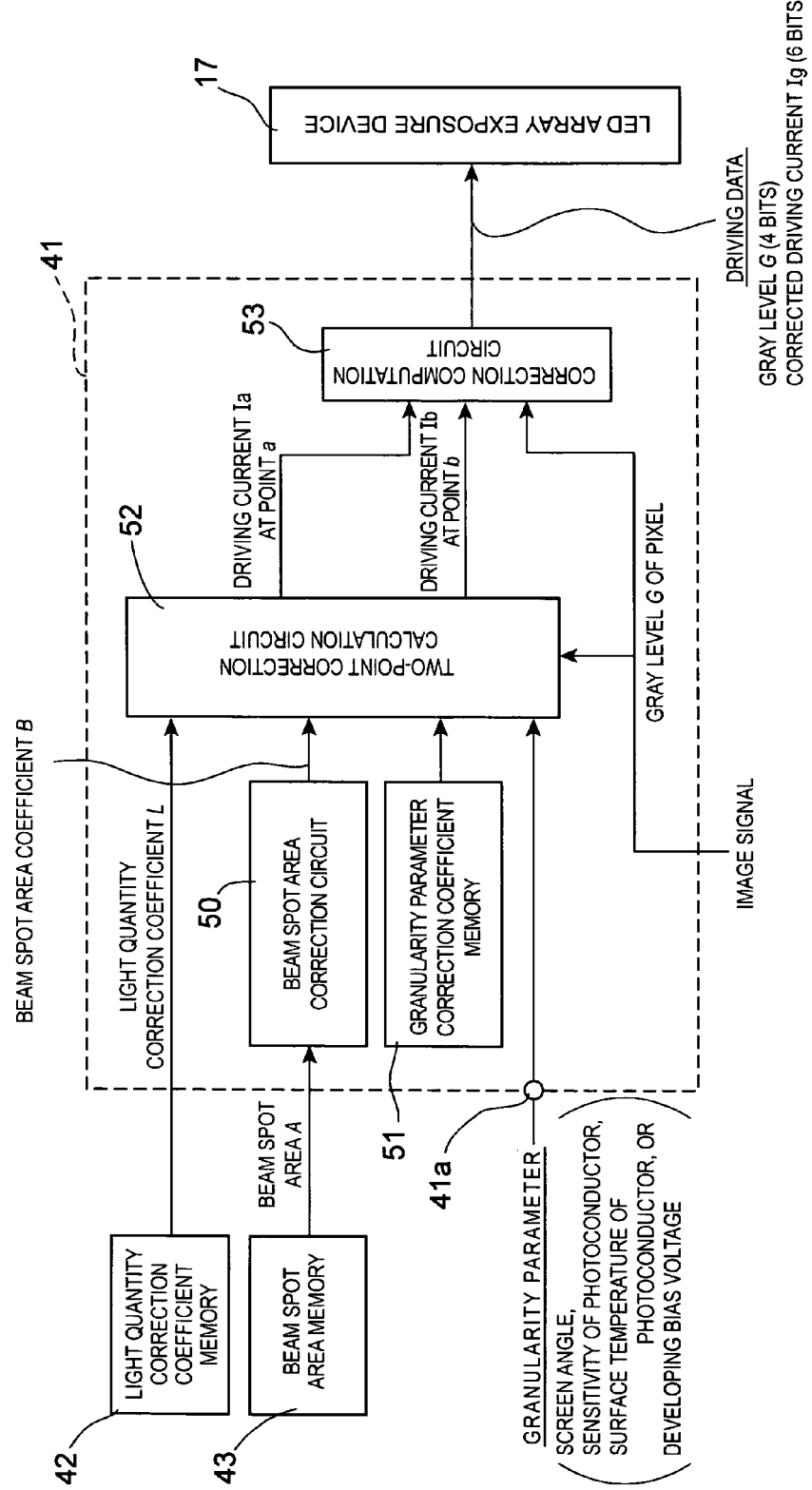
FIG. 17 is a block diagram showing the correction circuit 41 and peripheral circuits thereof shown in FIG. 9 more specifically.

FIG. 17 is a block diagram showing the correction circuit 41 and peripheral circuits thereof shown in FIG. 9 more specifically. The gray level of pixel is represented by 4 bits (16 gray levels). Moreover, it is assumed that the light-emitting element corresponding to the pixel is driven by a driving current represented by 6-bit data (64 levels). In FIG. 17, when an image signal is fed to the correction circuit 41, the correction circuit 41 reads the beam spot area A of the light-emitting element corresponding to each pixel from a beam spot area memory 43, performs a correction described later for the beam spot area A by using a beam spot area correction circuit 50, and feeds the resultant value as a beam spot area correction coefficient B to a two-point correction calculation circuit 52. The two-point correction calculation circuit 52 is fed with a parameter (screen angle, sensitivity of photoconductor, surface temperature of photoconductor, or developing bias voltage) that affects the granularity and with a gray level G of pixel included in the image signal. Furthermore, the two-point correction calculation circuit 52 reads a light quantity correction coefficient L of the light-emitting element corresponding to each pixel from a light quantity correction coefficient memory 42 and calculates a driving current Ia comprising 6 bits at the point a (low gray level) and a driving current Ib also comprising 6 bits at the point b (high gray level) in a manner discussed later.

A granularity parameter correction coefficient memory 51 memorizes correction coefficients corresponding to the higher gray level and the lower gray level respectively for each screen angle if the granularity parameter is the screen angle. Correction coefficients corresponding to the higher gray level and the lower gray level respectively for each sensitivity value of photoconductor are memorized if the granularity parameter is the sensitivity of photoconductor. Correction coefficients corresponding to the higher gray level and the lower gray level respectively for each surface temperature of photoconductor are memorized if the granularity parameter is the surface temperature of photoconductor. Correction coefficients corresponding to the higher gray level and the lower gray level respectively for each developing bias voltage are memorized if the granularity parameter is the developing bias voltage. Therefore, these correction coefficients are read for the successive correction processes.

A correction computation circuit 53 receives the image signal, the driving current Ia, and the driving current Ib, and calculates a corrected driving current Ig comprising 6 bits by using linear interpolation from a slanted line connecting between the driving current Ia at point a and the driving current Ib at point b in accordance with the gray level G of the pixel included in the image signal. Thereafter, the correction computation circuit 53 feeds out driving data comprising the 4-bit gray level G and the 6-bit corrected driving current Ig to the LED array exposure device 17. The LED array exposure device 17 turns on the light-emitting element for the duration expressed by the gray level G of the pixel by the corrected driving current Ig fed through the driver IC 33 (FIGS. 2 and 3) in accordance with the driving data.

Next, a third and a fourth correction methods including a correction for the granularity parameter in a higher gray level and a lower gray level will be described with reference to FIG. 18 to FIG. 19 respectively. Although, in the interest of clarity, the granularity parameters are exemplified by the screen angle in the following descriptions, it is possible to replace the screen angle and parts relating thereto with the sensitivity of photoconductor, the surface temperature of photoconductor, or the developing bias voltage. In addition, a large or a small screen angle corresponds to a high or a low sensitivity of photoconductor, a high or a low surface temperature of photoconductor, and a high or a low developing bias voltage respectively.

Third Correction Method>

FIG. 18 is a flowchart-type schematic diagram showing the third correction method relating to the present invention to be performed in driving each light-emitting element. To simplify the descriptions, one correction group is assumed to be composed of five light-emitting elements. However, it is desirable that one correction group comprise one LED array chip or 32 to 256 light-emitting elements in actual cases.

In FIG. 18, in the first step S41, pixel data to be printed are taken into the correction circuit 41. Here, a first pixel is pixel #1 and pixels up to pixel #5 are shown. In the next step S42, the gray level G that each of pixel #1 to pixel #5 has is read. In step S43, the screen angle S is read. In S44, the light quantity correction coefficient L of the light-emitting element corresponding to each of pixel #1 to pixel #5 is read. In S45, the beam spot area A of the light-emitting element corresponding to each pixel is read. In S46, an average value M of the beam spot areas for pixel #1 to #5 is calculated. In S47, a difference D (M−A) between the average value M and the beam spot area A for each pixel is calculated. Furthermore, in S48, a ratio P (D/M) of each difference D to the average value M is calculated.

The larger an absolute value of the ratio P obtained in this way is, the more the beam spot area A of the light-emitting element corresponding to that pixel varies from the average of the group. Because of this reason, in S49, the ratio P obtained as above is weighted for correction. Coefficients required for correcting for the ratio P to the degree corresponding to the weight thereof should be obtained through a separate test. Thus obtained coefficient is called a beam spot area correction coefficient B. In the next step S50-1, a correction coefficient Ca at point a is obtained through a process of assigning weights according to the screen angle S for a lower gray level (a process of screen angle correction coefficient calculation) so that a weaker correction is applied if the screen angle S is larger or a stronger correction is applied if the screen angle S is smaller as explained before. In a similar manner, in S50-2, a correction coefficient Cb at point b is obtained through a process of assigning weights according to the screen angle S for a higher gray level (a process of screen angle correction coefficient calculation) so that a stronger correction is applied if the screen angle S is larger or a weaker correction is applied if the screen angle S is smaller as explained before.

In the next step S51-1, a standard driving current for the light-emitting elements is multiplied by the light quantity correction coefficient L for each pixel and further multiplied by the correction coefficient Ca at point a obtained as mentioned above so as to produce the driving current Ia at point a for each light-emitting element. In a similar manner, in S51-2, the standard driving current for the light-emitting elements is multiplied by the light quantity correction coefficient L for each pixel and further multiplied by the correction coefficient Cb at point b obtained as mentioned above so as to produce the driving current 1b at point b for each light-emitting element. Finally, in S51-3, the corrected driving current Ig is obtained by using linear interpolation on a slanted line connecting between the driving current Ia at point a and the driving current Ib at point b in accordance with the gray level G of the pixel.

Because the light-emitting element of the LED array exposure device 17 is corrected with consideration given to the influence of the lens array 32 through a method as described above for variations appearing in the observed image which is affected by the light quantity, the beam spot area, or the screen angle, it is possible to achieve a substantial reduction in the occurrence of uneven densities or streaks. In the example explained above, because the correction is performed for each light-emitting element within a group consisting of five by averaging the group, the pixels are printed uniformly if the average values between the groups are almost identical. However, if the average value differs from group to group, it is possible to obtain more effective results by employing the following method.

<Fourth Correction Method>

FIG. 19 is a flowchart-type schematic diagram showing the fourth correction method relating to the present invention to be performed in driving each light-emitting element. To simplify the descriptions, one correction group is assumed to be composed of five light-emitting elements. However, it is desirable that one correction group comprise one LED array chip or 32 to 256 light-emitting elements in actual cases.

In FIG. 19, in the first step S61, N pieces of pixel data for each scan line or scan block (e.g., an LED array chip as a unit) to be printed are taken into the correction circuit 41. The pixels are numbered from #1 to #N and a particular pixel is #n. In FIG. 19, the pixels from the first pixel #1 to pixel #9 are shown. In the next step S62, the gray level G is read. In S63, the screen angle S is read. In S64, the light quantity correction coefficient L of the light-emitting element corresponding to each pixel is read. In S65, the beam spot area A of the light-emitting element corresponding to each pixel is read. In S66-1, by making pixel #1 a targeted pixel, an average value M1 of the beam spot areas A for pixel #1 to #5 is calculated. In S66-2, by making pixel #2 a targeted pixel, an average value M2 of the beam spot areas A for pixel #2 to #6 is calculated. In S66-3, by making pixel #3 a targeted pixel, an average value M3 of the beam spot areas A for pixel #13 to #7 is calculated. In S66-4, by making pixel #4 a targeted pixel, an average value M4 of the beam spot areas A for pixel #4 to #8 is calculated. In S66-5, by making pixel #5 a targeted pixel, an average value M5 of the beam spot areas A for pixel #5 to #9 is calculated. In the same manner, the average values Mn are obtained until the targeted pixel becomes pixel #N.

In actual cases, the light-emitting elements are laid beyond the effective scanning width. Therefore, if the average value M is to be obtained by making the last pixel #N within the effective scanning width the targeted pixel, it is possible to use the light-emitting elements laid beyond effective scanning width. Alternatively, it is also possible to reduce a sampling number for calculating the average value M for a region including the last pixel. In S67, a difference Dn (Mn−An) between the average value Mn for the targeted pixel #n and the beam spot area An of that pixel is calculated. Furthermore, in S68, a ratio Pn (Dn/Mn) of the difference Dn to the average value Mn is calculated.

The larger an absolute value of the ratio Pn obtained in this way is, the more the beam spot area An of the light-emitting element corresponding to that pixel varies from the average of the group. Because of this reason, in S69, the ratio Pn obtained as above is weighted for correction. Coefficients required for correcting for the ratio Pn to the degree corresponding to the weight thereof should be obtained through a separate test. Thus obtained coefficient is called a beam spot area correction coefficient Bn. In the next step S70-1, the correction coefficient Ca at point a is obtained through a process of assigning weights according to the screen angle S in a lower gray level (a process of screen angle correction coefficient calculation) so that a weaker correction is applied if the screen angle S is larger or a stronger correction is applied if the screen angle S is smaller as explained before. In a similar manner, in S70-2, the correction coefficient Cb at point b is obtained through a process of assigning weights according to the screen angle S in a higher gray level (a process of screen angle correction coefficient calculation) so that a stronger correction is applied if the screen angle S is larger or a weaker correction is applied if the screen angle S is smaller as explained before.

In the next step S71-1, a standard driving current for the light-emitting elements is multiplied by the light quantity correction coefficient L for each pixel and further multiplied by the correction coefficient Ca at point a obtained as mentioned above so as to produce the driving current Ia at point a for each light-emitting element. In a similar manner, in S71-2, the standard driving current for the light-emitting elements is multiplied by the light quantity correction coefficient L for each pixel and further multiplied by the correction coefficient Cb at point b obtained as mentioned above so as to produce the driving current Ib at point b for each light-emitting element. Finally, in S71-3, the corrected driving current Ig is obtained by using linear interpolation on a slanted line connecting between the driving current Ia at point a and the driving current Ib at point b in accordance with the gray level G of the pixel.

In the above-mentioned method, by using an average value (moving average) of a moving group based on a targeted pixel, the light-emitting element of the LED array exposure device 17 is corrected with consideration given to the influence of the lens array 32 for variations appearing in the observed image which is affected by the light quantity, the beam spot area, or the screen angle. Because the correction is based on a moving average, it is possible to make lenient continuous corrections and thus further reduce the uneven densities or streaks being generated.

In the first to fourth correction methods, although the descriptions are based on an example using a group of five pixels including and following the targeted pixel in order to obtain the average value M, it is possible to use not only a plurality of pixels including and following the targeted pixel, but also a plurality of pixels continuing across the targeted pixel. Moreover, the pixels in the group may be contiguous pixels or discontiguous pixels such as the pixels picked up every other pixel. Additionally, it goes without saying that a number of pixels forming the group are not limited to five as mentioned earlier. Values used in describing these correction methods are for the purpose of helping facilitate understanding of the present invention, and the scope thereof is not bounded by these values.

Furthermore, although the examples described above deal with a pixel having 16 gray levels (4 bits) and the driving current for the light-emitting element divided into 64 levels (6 bits), it is to be understood that within the scope of the present invention, the invention may be practiced other than as specifically described. In addition, the corrections described with reference to FIG. 10, FIG. 11, FIG. 18, and FIG. 19 may be performed by a controller provided in the LED array exposure device 17, an external controller, or a controlling portion included in a control circuit of the color printer 11. Also, the corrections may be performed by arithmetic computations, a circuit integrated in an ASIC (application-specific integrated circuit), or the like.

In the first to fourth correction methods, it has been explained that the granularity parameter is one of the screen angle, the sensitivity of photoconductor, the surface temperature of photoconductor, and the developing bias voltage. In actual cases, the extent to which the granularity of image is affected by each of the granularity parameters is different depending on a configuration, components to be used in the color printer 11, type of consumables, or the like, it is desirable that such a granularity parameter that affects the most be selected and that the correction be performed for that granularity parameter.

In case there are two granularity parameters that affect the granularity of image significantly, for example, a granularity correction coefficient by which the granularity is minimized is obtained through an experiment in which various types of combinations of a first granularity parameter and a second granularity parameter each of which weighted to different degrees are tested. Thereafter, these combinations and the granularity correction coefficients are entered into a database and incorporated into the correction circuit 41 shown in FIG. 9 or FIG. 17 as an optimization circuit. In this way, it is possible to perform each correction described in the first to fourth correction methods.

FIG. 20, based on FIG. 9 relating to the first and second correction methods, is a diagram showing a method in which two types of granularity parameters are fed in; a granularity correction coefficient by which the granularity is minimized is obtained through the optimization circuit; and thus obtained granularity correction coefficient is used in a correction circuit. The illustration shows an example in which the screen angle is used as the first granularity parameter and the developing bias voltage as the second granularity parameter. The screen angle is fed to a first parameter input terminal 41a and the developing bias voltage is fed to a second parameter input terminal 41b. An optimization circuit 41c arranged inside of a correction circuit 41 holds the database whose data have been obtained through the above-mentioned test as a data table. Therefore, even if two granularity parameters are combined, a granularity correction parameter by which the granularity is minimized is fed and used by the correction circuit 41 for the compensation control. The granularity correction coefficient described here corresponds to the correction coefficient for the screen angle explained in step S9 in FIG. 10 or the correction coefficient for the screen angle explained in step S29 in FIG. 11.

Figure 21:
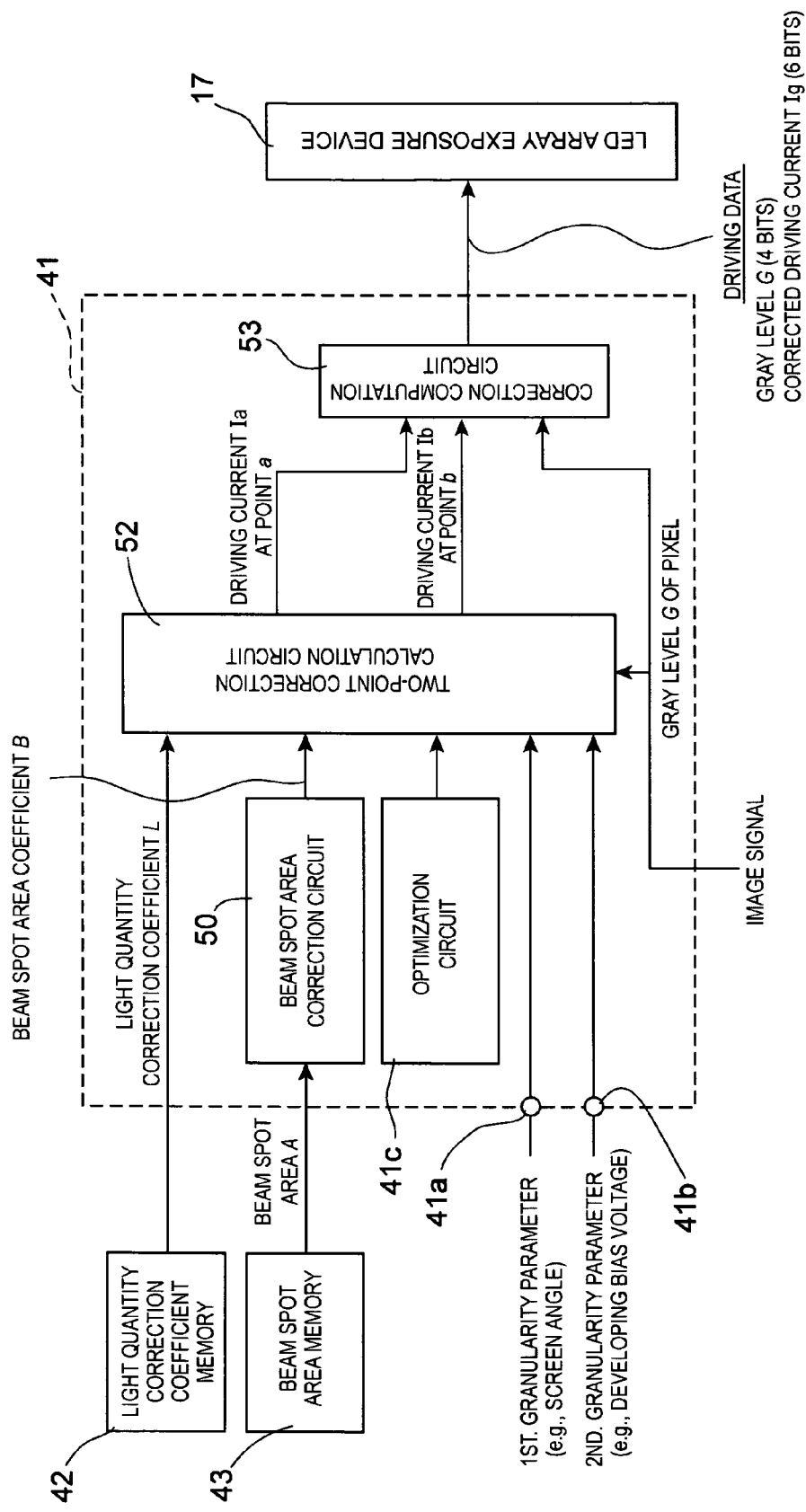
FIG. 21, based on FIG. 17 relating to the third and fourth correction methods, is a diagram showing a method in which two different types of granularity parameters are fed in; granularity correction coefficients by which the granularity is minimized for a lower and a higher gray levels respectively is obtained through the optimization circuit; and the correction is performed by using a resultant value obtained by using linear interpolation whose calculation is performed in a two-point correction calculation circuit.

FIG. 21, based on FIG. 17 relating to the third and fourth correction methods, is a diagram showing a method in which two different types of granularity parameters are fed in; granularity correction coefficients by which the granularity is minimized for a lower and a higher gray levels respectively is obtained through the optimization circuit; and the correction is performed by using a resultant value obtained by using linear interpolation whose calculation is performed in a two-point correction calculation circuit. The illustration shows an example in which the screen angle is used as the first granularity parameter and the developing bias voltage as the second granularity parameter.

Through a first parameter input terminal 41a and a second parameter input terminal 41b, a screen angle and a developing bias voltage are fed to a two-point correction calculation circuit 52 respectively. Granularity correction coefficients for a lower and a higher gray levels respectively are fed to the two-point correction calculation circuit 52. Then, a corrected driving current Ia at point a and a corrected driving current Ib at point b are calculated and fed to a correction computation circuit 53 so that linear interpolation is performed in accordance with a gray level G of pixel. The granularity correction coefficient described here corresponds to the correction coefficient for the screen angle for a lower gray level explained in step S50-1 in FIG. 18 or the correction coefficient for the screen angle for a higher gray level explained in step S50-2. The granularity correction coefficient described here also corresponds to the correction coefficient for the screen angle for a lower gray level explained in step S70-1 in FIG. 19 or the correction coefficient for the screen angle for a higher gray level explained in step S70-2.

Although the example of combining the screen angle and the developing bias voltage as two granularity parameters has been described above, it is also possible to combine other granularity parameters or combine three or more granularity parameters.

According to the present invention, as described before, the present invention provides the following advantages.

According to the present invention, the LED array exposure device is so configured that a correction for light quantity is superimposed on by a correction for beam spot area for variations in beam spot areas of a light beam which passed through a lens array and a weighted correction for the magnitude of the correction for beam spot area in accordance with such a parameter that affects the image granularity as a screen angle of pixel, a sensitivity of photoconductor, a surface temperature of photoconductor, and a developing bias voltage. Consequently, the present invention provides an advantage in which the uneven densities or streaks appearing in the image can be significantly reduced, which otherwise cannot be achieved effectively by way of a conventional method for performing only a correction for light quantity.

According to another aspect of the present invention, the LED array exposure device is so configured that a correction for light quantity is superimposed on, according to the gray level of pixel, by a correction for beam spot area for variations in beam spot areas of a light beam which passed through a lens array and a weighted correction for the magnitude of the correction for beam spot area in accordance with such a parameter that affects the image granularity as a screen angle of pixel, a sensitivity of photoconductor, a surface temperature of photoconductor, and a developing bias voltage. It is possible to further reduce the uneven densities or streaks appearing in the image.

Furthermore, according to the present invention, the beam spot area correction coefficient is a value that corresponds to a magnitude of a difference between an average value obtained by averaging out beam spot areas of a plurality of light-emitting elements including the light-emitting element for which a correction is performed and the beam spot area of the light-emitting element for which a correction is performed. According to this configuration, adverse effects caused by a sharp step-by-step correction are hard to occur.

According to another aspect of the present invention, the plurality of light-emitting elements are shifted along with the light-emitting element for which a correction is performed so that a moving average is obtained as the average value of beam spot areas. In this configuration, the correction is performed gradually, thereby making borders of corrections hard to be recognizable.

What is claimed is:

1. An LED array exposure device comprising:
a plurality of light-emitting elements for exposing a photoconductor so as to form an image, the plurality including a light-emitting element for which correction is performed, the light-emitting element, so as to be compensated for variations, driven by a driving current obtained from a standard driving current common to the light-emitting elements through a process of incorporating a light quantity correction coefficient for compensating for variations of light quantity emitted from the light-emitting element, and a beam spot area correction coefficient for compensating for variations of a beam spot area formed on the photoconductor, the light-emitting element being so controlled as to be driven by the driving current for a length of time in accordance with a gray level of an image pixel to which the light-emitting element corresponds,
wherein an average value is obtained by averaging out beam spot areas of the plurality of light-emitting elements, including the light-emitting element;
a difference is obtained by subtracting a beam spot area of the light-emitting element from the average value of the beam spot areas;
a ratio of the difference is obtained by dividing the difference by the average value of the beam spot areas;
a beam spot area correction coefficient for the light-emitting element is calculated in accordance with the ratio of the difference;
a granularity correction coefficient for reducing granularity is calculated in accordance with the magnitude of a parameter that affects granularity in an image; and
the driving current for the light-emitting element is obtained by multiplying the standard driving current by the light quantity correction coefficient, the beam spot area correction coefficient, and the granularity correction coefficient.

2. An LED array exposure device as claimed in claim 1, wherein the plurality of light-emitting elements are shifted along with the light-emitting element for which a correction is performed so that a moving average is obtained as the average value of beam spot areas.

3. An LED array exposure device as claimed in claim 1, wherein the plurality of light-emitting elements comprise the light-emitting element for which a correction is performed and light-emitting elements immediately following thereto.

4. An LED array exposure device as claimed in claim 1, wherein the LED array exposure device comprises a plurality of LED array chips, and the plurality of light-emitting elements comprise light-emitting elements within an identical LED array chip which includes the light-emitting element for which a correction is performed.

5. An LED array exposure device as claimed in claim 1, wherein the parameter affecting the granularity of the image is a screen angle peculiar to an image pixel corresponding to the light-emitting element.

6. An LED array exposure device as claimed in claim 1, wherein the parameter affecting the granularity of the image is a sensitivity of the photoconductor.

7. An LED array exposure device as claimed in claim 1, wherein the parameter affecting the granularity of the image is a surface temperature of the photoconductor.

8. An LED array exposure device as claimed in claim 1, wherein the parameter affecting the granularity of the image is a developing bias voltage applied to a developing apparatus.

9. An image forming apparatus comprising the LED array exposure device as set forth in claim 1.

10. An LED array exposure device comprising:
a plurality of light-emitting elements for exposing a photoconductor so as to form an image, the light-emitting element, so as to be compensated for variations, driven by a driving current obtained from a standard driving current common to the plurality of light-emitting elements through a process of incorporating a light quantity correction coefficient for compensating for variations of a light quantity emitted from the light-emitting element and a beam spot area correction coefficient for compensating for variations of an area of a beam spot formed on the photoconductor, the light-emitting element being so controlled as to be driven by the driving current for a length of time in accordance with a gray level of an image pixel to which the light-emitting element corresponds, wherein, first, a driving current in a low gray level is obtained through a process of multiplying the standard driving current by a correction coefficient corresponding to a magnitude of a parameter affecting a granularity of the image when the image pixel has a low gray level, the beam spot area correction coefficient for the light-emitting element, and the light quantity correction coefficient for the light-emitting element;

second, a driving current in a high gray level is obtained through a process of multiplying the standard driving current by a correction coefficient corresponding to a magnitude of a parameter affecting a granularity of the image when the image pixel has a high gray level, the beam spot area correction coefficient for the light-emitting element, and the light quantity correction coefficient for the light-emitting element; and finally, the driving current for driving the light-emitting element is obtained by using linear interpolation from the driving current in the low gray level to the driving current in the high gray level in accordance with the gray level of the image pixel to which the light-emitting element corresponds.

11. An LED array exposure device as claimed in claim 10, wherein the beam spot area correction coefficient is a value that corresponds to a magnitude of a difference between an average value obtained by averaging out beam spot areas of the plurality of light-emitting elements including the light-emitting element for which a correction is performed and the beam spot area of the light-emitting element for which a correction is performed.

12. An LED array exposure device as claimed in claim 11, wherein the plurality of light-emitting elements are shifted along with the light-emitting element for which a correction is performed so that a moving average is obtained as the average value of beam spot areas.

13. An LED array exposure device as claimed in claim 11, wherein the plurality of light-emitting elements comprise the light-emitting element for which a correction is performed and light-emitting elements immediately following thereto.

14. An LED array exposure device as claimed in claim 11, wherein the LED array exposure device comprises a plurality of LED array chips, and the plurality of light-emitting elements comprise light-emitting elements within an identical LED array chip which includes the light-emitting element for which a correction is performed.

15. An LED array exposure device as claimed in claim 10, wherein the parameter affecting the granularity of the image is a screen angle peculiar to an image pixel corresponding to the light-emitting element.

16. An LED array exposure device as claimed in claim 10, wherein the parameter affecting the granularity of the image is a sensitivity of the photoconductor.

17. An LED array exposure device as claimed in claim 10, wherein the parameter affecting the granularity of the image is a surface temperature of the photoconductor.

18. An LED array exposure device as claimed in claim 10, wherein the parameter affecting the granularity of the image is a developing bias voltage applied to a developing apparatus.

19. An image forming apparatus comprising the LED array exposure device as set forth in claim 10.

20. A method of controlling an LED array exposure device comprising a plurality of light-emitting elements for exposing a photoconductor, the plurality of light-emitting elements including a light-emitting element for which correction is performed, the method including:

a first step of obtaining an average value by averaging out beam spot areas of the plurality of light-emitting elements;

a second step of obtaining a difference by subtracting a beam spot area of the light-emitting element from the average value of the beam spot areas;

a third step of obtaining a ratio of the difference by dividing the difference by the average value of the beam spot areas;

a fourth step of calculating a beam spot area correction coefficient for the light-emitting element in accordance with the ratio of the difference;

a fifth step of calculating a granularity correction coefficient for reducing granularity in accordance with the magnitude of a parameter that affects granularity in an image;

a sixth step of obtaining a driving current for the light-emitting element by multiplying the standard driving current by the light ciuantitv correction coefficient, the beam spot area correction coefficient, and the granularity correction coefficient; and a seventh step of driving the light-emitting element by feeding the driving current.

21. A method of controlling an LED array exposure device comprising a plurality of light-emitting elements for exposing a photoconductor, including:

a first step of obtaining a driving current in a low gray level through a process of multiplying a standard driving current common to the plurality of light-emitting elements by a) a light quantity correction coefficient for correcting for a variation of a light quantity of a light-emitting element, b) a beam spot area correction coefficient for correcting for a variation of an area of a beam spot formed on the photoconductor by the light-emitting element, and c) a correction coefficient corresponding to a magnitude of a parameter affecting a granularity of an image when a image pixel corresponding to the light-emitting element has a low gray level;

a second step of obtaining a driving current in a high gray level through a process of multiplying the standard driving current common to the plurality of light-emitting elements by a) the light quantity correction coefficient for correcting for a variation of a light quantity of the light-emitting element, b) the beam spot area correction coefficient for correcting for a variation of an area of a beam spot formed on the photoconductor by the light-emitting element, and c) a correction coefficient corresponding to a magnitude of a parameter affecting a granularity of an image when the image pixel corresponding to the light-emitting element has a high gray level; and a third step of obtaining a driving current by which the light-emitting element is driven by using linear interpolation from the driving current in the low gray level to the driving current in the high gray level in accordance with a gray level of the image pixel to which the light-emitting element corresponds.

* * * * *